US012370452B2

(12) United States Patent
Rao

(10) Patent No.: US 12,370,452 B2
(45) Date of Patent: Jul. 29, 2025

(54) REAL WORLD SIMULATION FOR META-VERSE

(71) Applicant: Sony Interactive Entertainment Inc., Tokyo (JP)

(72) Inventor: Akshay V. Rao, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 354 days.

(21) Appl. No.: 17/966,602

(22) Filed: Oct. 14, 2022

(65) Prior Publication Data

US 2024/0123353 A1 Apr. 18, 2024

(51) Int. Cl.
*A63F 13/69* (2014.01)
*A63F 13/577* (2014.01)
*A63F 13/847* (2014.01)
*H04L 9/00* (2022.01)

(52) U.S. Cl.
CPC ............ *A63F 13/69* (2014.09); *A63F 13/577* (2014.09); *A63F 13/847* (2014.09); *H04L 9/50* (2022.05); *A63F 2300/8082* (2013.01)

(58) Field of Classification Search
CPC ...... A63F 13/69; A63F 13/577; A63F 13/847; A63F 2300/8082; A63F 13/63; H04L 9/50
USPC .......................................................... 463/31
See application file for complete search history.

(56) References Cited

U.S. PATENT DOCUMENTS

| 10,569,164 B1* | 2/2020 | Bleasdale-Shepherd ................... A63F 13/525 |
| 10,675,542 B2* | 6/2020 | Drouin .................... A63F 13/86 |
| 10,888,778 B2* | 1/2021 | Bleasdale-Shepherd ................... A63F 13/26 |
| 2019/0240579 A1* | 8/2019 | Drouin .................... A63F 13/69 |
| 2020/0147486 A1* | 5/2020 | Bleasdale-Shepherd ................... A63F 13/26 |
| 2022/0233959 A1* | 7/2022 | Tsuda ...................... A63F 13/56 |

FOREIGN PATENT DOCUMENTS

CN 114100119 A 3/2022

OTHER PUBLICATIONS

ISR & WO PCT/US2023/076553, dated Feb. 5, 2024, 11 pages.

\* cited by examiner

*Primary Examiner* — Pierre E Elisca
(74) *Attorney, Agent, or Firm* — Kilpatrick Townsend & Stockton LLP

(57) ABSTRACT

Methods and systems for reconstructing a game world of a video game includes tracking status of game objects in the game world to detect wear on the one or more game objects exceeding a predefined threshold. An option to rebuild the one or more game objects is provided to a user and tools to rebuild the one or more game objects are provide in response to the user selecting the option to rebuild the game objects. The rebuilt game objects are used during subsequent gameplay of the video game.

21 Claims, 12 Drawing Sheets

REAL WORLD SIMULATION FOR META-VERSE

FIELD

The present disclosure relates to systems and methods for reconstructing a game world of a video game for a user, and more specifically providing the user with tools to shape and build the game world of the video game.

BACKGROUND

With the growing popularity of video games, users are able to enjoy viewing and interacting with a video game locally or from anywhere. The user provides inputs to the video game, which are interpreted by game logic of the video game to generate game data that reflects a current game state of the video game. The game data includes sufficient details related to game play to construct game scenes in accordance to current game state. The game scenes include one or more game objects, wherein the game objects can include game assets of users, game characters representing users, and other moving and/or stationary objects that make up the game scene. The game data is streamed to client devices of the one or more users for rendering to allow the users to understand the current game state during game play, so that the users can strategize and provide appropriate inputs. The video game can be hosted by a cloud service or can be hosted on a game console. Further, the video game can be played by a single user (single-player video game) or by a plurality of users (multi-player video game). The video game hosted on the cloud service can be accessed by the user from anywhere.

As the user plays the video game, the game objects used in the video game can age over time due to constant exposure to actions performed in the video game and to other physical and environmental factors defined by the game logic of the video game. The actions can be a result of interactions provided by the user or by other users or by other game objects, or can be due to virtual deterioration defined for the game object over time. These damages stay as part of the game objects.

Additionally, the game scenes are designed by a developer of the video game and are fixed. The user may like to change the game scene to incorporate their own style or may want to re-design to provide additional challenges.

It is in this context that embodiments of the invention arise.

SUMMARY

Implementations of the present disclosure relate to systems and methods for reconstructing game scenes of a video game for a user. The reconstruction takes into account the amount of wear exhibited by each game object within a game scene and based on the amount of wear, one or more tools are provided for the user to rebuild the one or more game objects and or game scenes of the game world. Alternately or additionally, in some implementations, when the user is in control of the video game, one or more tools are provided to rebuild one or more game objects and reconstruct one or more game scenes of the video game. The tools are provided to allow the user to get more involved in shaping and building the game world, thereby allowing the user to customize the game world to their taste.

In one implementation, a method for reconstructing a game world of a video game is disclosed. The method includes tracking status of one or more game objects included in the game world of the video game over time. The one or more game objects are used to define game scenes provided for rendering at client devices of a plurality of users. Wear on the one or more game objects are detected over time due to exposure of the one or more game objects to interactions resulting in actions occurring in the game world during game play. An option is provided to a user to rebuild the one or more game objects used in the game world that has experienced the wear. In response to the user selecting the option to rebuild, one or more tools are provided to rebuild the one or more game objects in the game world. The one or more tools allow the user to specify changes for applying to the one or more game objects in the game world.

In another implementation, a method for reconstructing a game world of a video game is disclosed. The method includes tracking a status of the user in the game world during game play of the video game. The status of the user in the video game is evaluated and when the user is detected to have control of the video game during the game play, one or more options are provided to the user to rebuild one or more game scenes of the game world. Each game scene of the one or more game scenes are defined using virtual game objects. In response to the user selecting the option to rebuild the one or more game scenes, one or more tools are provided to the user to dynamically rebuild the one or more game scenes of the game world, wherein rebuilding the one or more game scenes includes rebuilding one or more game objects included in the one or more game scenes.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which.

DETAILED DESCRIPTION

Figure 1:
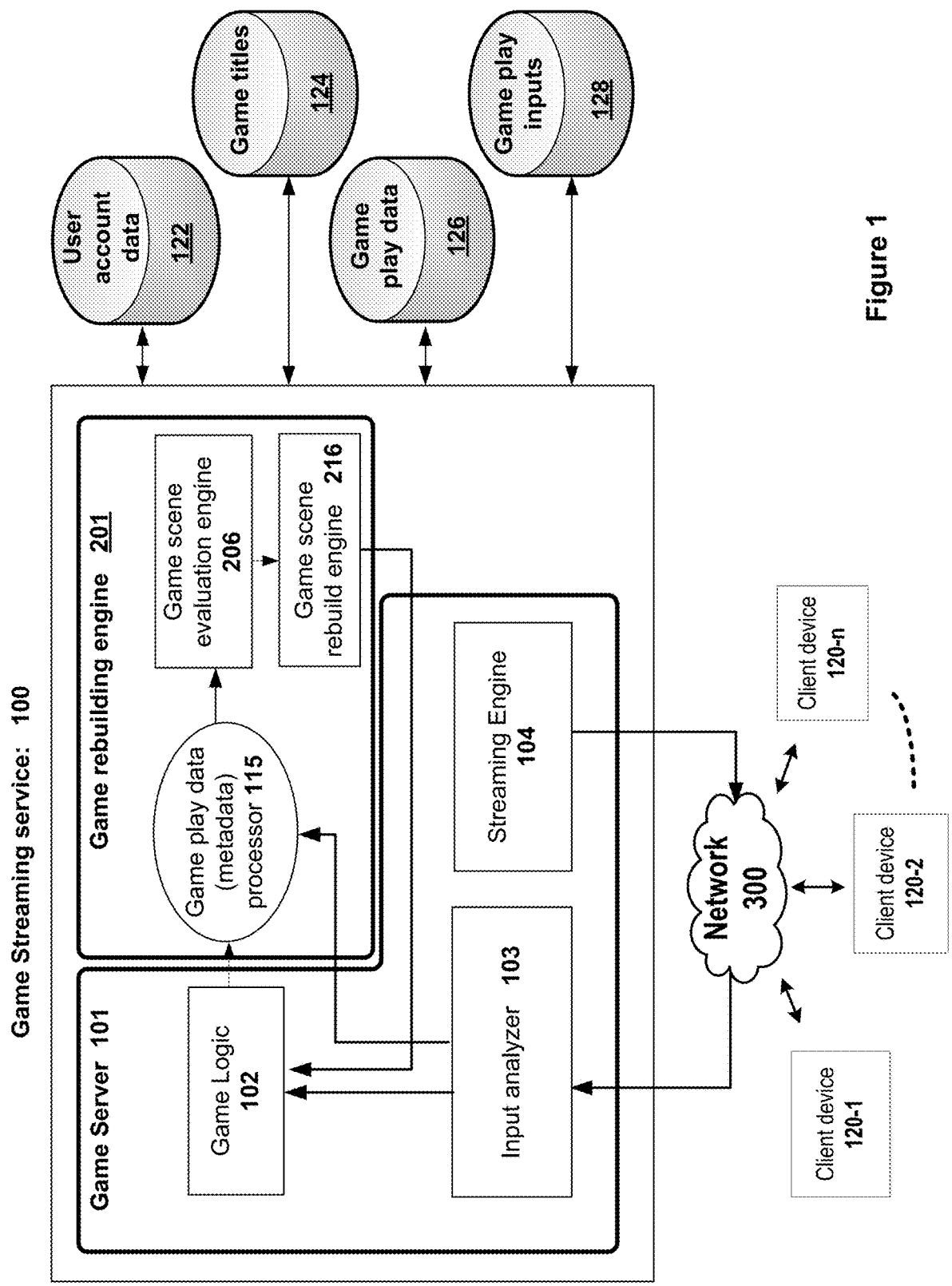
FIG. 1 is a simplified representation of a system that is used to provide tools to rebuild a game world of a video game, in one implementation.

Systems and method for rebuilding game world of a video game are described. It should be noted that various implementations of the present disclosure are practiced without some or all of the specific details. In other instances, well known process operations have not been described in detail in order not to unnecessarily obscure various embodiments of the present disclosure.

The various implementations described herein allow a user to rebuild game assets possessed by a user in a video game when the game assets show wear. The wear of the game assets can be due to prolonged exposure to environmental factors caused by interactions occurring in the video game. In addition to game assets associated with the user, one or more game objects included in game scenes of the video game may also show some wear for similar reasons as the game assets of the user. The wear on the game objects/game assets are shown as damages and remain as part of the corresponding game objects. In some cases, an option is provided to the user to rebuild game assets and game objects upon detecting a certain amount of wear (e.g., exceeding a predefined threshold). In other cases, the option is provided to allow the user to rebuild game assets and/or game objects at any time irrespective of the state of the game assets/game objects (i.e., irrespective of amount of wear exhibited by the game assets/game objects). In some implementations, the option is provided to the user to select certain ones of the game objects to rebuild (e.g., one or more game assets that are in the possession of the user). In such cases, the option provided to the user can include additional options to identify specific ones of the game object (e.g., select ones of the game assets possessed by the user) for rebuilding. The specific ones that can be identified include a subset of the game assets or all of the game assets in the possession of the user.

In some implementations, the option may be used to identify a specific game scene for rebuilding. In some implementations, the specific game scene is identified when one or more of the game objects included therein are exhibiting wear greater than a predefined threshold or when a cumulative wear of the game objects in the game scene exceeds the predefined threshold. In other implementations, the specific game scene is identified for rebuilding upon detecting the user taking control of the video game included in the game scene. For example, the user is considered to have taken control of a game scene when the user has defeated an adversary (i.e., opponent) or a game character, or has overcome all the challenges present in the game scene. In some other implementations, user control of the video game can be considered in addition to the game objects exhibiting a certain amount of wear, when an option to rebuild is provided.

In some implementations, a plurality of options are provided to allow the user to select a specific game asset or game object, a group of game assets/game objects, a specific game scene or one or more game scenes for rebuilding. In some implementations, a game asset associated with the user may start exhibiting wear after a certain amount of game play. This may be due to the game asset being used for interactions in the various game scenes. As the game asset is being used more and more, the game asset can start exhibiting wear. Consequently, the option to rebuild the game asset can be provided for or from the game scene onward where the game asset is exhibiting the wear greater than a predefined threshold, wherein the predefined threshold can be defined for the game asset or the game scene or the overall video game in general. Depending on the option selected and the type of game objects being rebuilt by the user, appropriate game tools are identified and provided to the user. The user can use the game tools to specify changes that need to be made to the game assets, game objects and/or game scenes as part of rebuilding. The rebuilt game assets/game objects are then used in one or more game scenes to replace the existing game objects/game assets that are showing wear or are being updated. The rebuilt game objects in the one or more game scene(s) are used to interact with other game objects, game characters, and/or is a target for the interactions received from different sources (e.g., other users, other game objects) during game play of the video game. The various options provide a level of control to the user to specify changes to the look and feel of the game objects and to get involved in shaping and building the game world that was originally designed by a game developer/designer. The tools are provided to allow the user to specify the changes for applying to each game object that is selected for rebuilding and the game logic of the video game is designed to recognize the newly rebuilt game objects within the one or more game scenes when generating the game data for the video game.

The video game with the game objects can be part of the meta-verse. In some implementations, the meta-verse is considered as a platform agnostic and application agnostic digital space in which a user can navigate from one platform to another and from one application to another. A user can transfer one or more game objects from a video game executing on one platform to the video game executing on another platform or from one video game to a second video game. Consequently, any game object that is rebuilt on one platform or in one video game can be transferred to another platform or another video game.

With the general understanding of the disclosure, specific implementations of providing tools to rebuild one or more game objects and/or game scenes for a user will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 illustrates an example system for providing access to a video game for game play of a user in which one or more game objects can be rebuilt for a user, in one implementation. In one implementation, the system is a game streaming service 100 that is configured to host a plurality of video games. The game streaming service 100 includes one or more game servers 101. Each game server 101 is configured to host one or more video games available at the game streaming service. The video games available at the game streaming service 100 are stored in a game titles datastore 124 and retrieved as and when a video game needs to be instantiated. The game server 101 hosts game logic 102 for each video game that is available at the game streaming service 100. The game logic 102 provides details of the video game including genre of game, type of game (i.e., single player or multi-player game), game intensity, number of levels included, challenges, tasks, events included in each level, game scenes, game objects included in each game scene, sequence of operations expected, various routes that can be taken to achieve a goal or a task, various game states defined for different inputs provided to complete each task/challenge/event, etc.

A user initiates a game play session by selecting a video game from a plurality of video games available at the game streaming service 100, and initiating a game play request. The game play request is processed by the game streaming service 100 by first verifying the user using user credentials provided by the user against user profile data of the user stored in user account datastore 122. The video games at the game streaming service 100 can be generally made available to all the users or can be selectively made available to certain ones of the users via a subscription service. In the case of the video game being available via subscription service, the user can be additionally verified by querying a game titles datastore 124 to determine if the user has enrolled into the proper subscription service for accessing the video game. Once the user is successfully verified, the user is allowed to initiate the game play of the video game and provide inputs.

The inputs provided by the user are analyzed by an input analyzer component 103 available at the game server 101. The input analyzer component 103 can be part of or can be separate from the game logic 102. The inputs of the user are analyzed to identify the user who is providing the inputs, type of inputs provided, frequency of inputs provided, game scene where the inputs are provided, target of the inputs, identity of game object or game icon or user icon/character being targeted, etc. The game logic 102 processes the analyzed inputs provided by the input analyzer 103 to generate game state of the video game. The game state provides the status of the video game including status of various game objects, game scenes, and icons/game characters associated with the users within the video game. The game state is used to generate game play data which is provided to a streaming engine 104 for forwarding to client device(s) 120 (e.g., 120-1, 120-2, . . . 120-n) of the user(s) for rendering. The game play data is also stored in game play datastore 126 and retrieved, as and when required.

The streaming engine 104 engages compression technique to compress the game play data, and transmits the compressed game play data to the client device 120 of the user for rendering. The compression logic can use any known or novel compression technique and transmission protocol to compress and package the game play data for transmission to the client device(s) 120 of the user(s). In some implementations where the game server 101 is remotely located from the client device 120 of the user, the compressed and packaged game play data is transmitted over a network 300 to the client device 120. The transmitted game play data is rendered at a display screen associated with the client device 120 of the user.

The display screen can include liquid crystal display (LCD), a light emitting diode display, or a plasma display. The client device can be a head-mounted display (HMD), a desk-top computer, a lap-top computer, a mobile computing device including smartphones and tablet computing devices, a television or a smart television. The game server can be a game console or a game server that is part of a local area network, a wide area network, or a cloud service.

The game state details from the game logic 102 and the game inputs from the input analyzer 103 are provided as inputs to a game rebuilding engine 201, which employs game play data processor (i.e., metadata processor) 115 to analyze the game state details and the game inputs provided by the user(s) to determine the impact of the game inputs on different game objects/game scenes in the game world of the video game. A game scene evaluation engine 206b is used to identify a specific game scene that the user was in when the game inputs were provided and the game objects/game assets that were targeted and/or impacted by the game inputs. Additionally, the game scene evaluation engine 206b determines the state of the user (e.g., game character) in the game scene after considering (i.e., applying) the game inputs. The game inputs are stored in game play inputs datastore 128 and retrieved when the game objects have to be rebuilt. Depending on the amount of impact the game inputs of the user had on the different game objects and the state of the user after consideration (i.e., application) of the game inputs in the game scene, the game rebuilding engine 201 can engage the game scene rebuild engine 216 to rebuild one or more game objects and the game scene.

The game scene rebuild engine 216 is engaged to provide options to the user to consider rebuilding one or more game objects and/or the game scene. The options may be provided when the game rebuilding engine 201 detects a certain amount of wear on the game objects in the game scene or when the user has control of the game scene, for example. The amount of wear that is considered for rebuilding can be game object specific (e.g., certain amount of wear in a game object) or game scene specific (e.g., certain amount of damage caused within the game scene, which, for example, can be an accumulation of the wear on the various game objects) or game specific. The options provided by the game scene rebuild engine 216 can identify specific game objects for rebuilding (e.g., game objects that show wear greater than a predefined threshold value), specific group of game objects (e.g., game assets of the user) for rebuilding, or all the game objects within the game scene. It should be noted that the game objects used in the video game are virtual game objects that are identified using a plurality of attributes (e.g., physical attributes, kinetic attributes). Depending on the option selected by the user, appropriate one or more tools are provided to the user to specify changes to the select ones of the game objects, wherein the tools provided are identified based on type of game objects selected for rebuilding. In some implementations, the identified tool(s) for rebuilding provide a list of the attributes of the select one(s) of the game objects, including attributes that identify the wear (i.e., flaw or damage) and, the user can specify the changes to the game object(s) by identifying the select ones of the attributes and the specify the changes to the selected attributes. Using the input from the user, the game scene rebuild engine 216 generates corresponding rebuilt game objects by applying changes to the specific ones of the attributes of the game objects. The resulting rebuilt game objects generated from the user's inputs are devoid of the flaws/wear caused by the interactions in the game scene. The rebuilt game objects are then used by the game scene rebuild engine 216 to replace the corresponding ones of the game objects within the game scene. The changes to the game scene are stored in the game play datastore 126 by the game rebuilding engine 201. The game logic 102 retrieves the rebuilt game objects from the game play datastore 126 when generating game play data for the video game. The game play data with the rebuilt game objects are forwarded to the streaming engine 104 for compression and transmission to relevant client device(s) 120 of user(s) over the network 300. The game play data with the rebuilt game objects and/or game scenes can be generated by the game logic 102 for a current game play session, in some implementation. In alternate implementation, the game logic can retrieve and use the rebuilt game objects for subsequent game play sessions.

Figure 2:
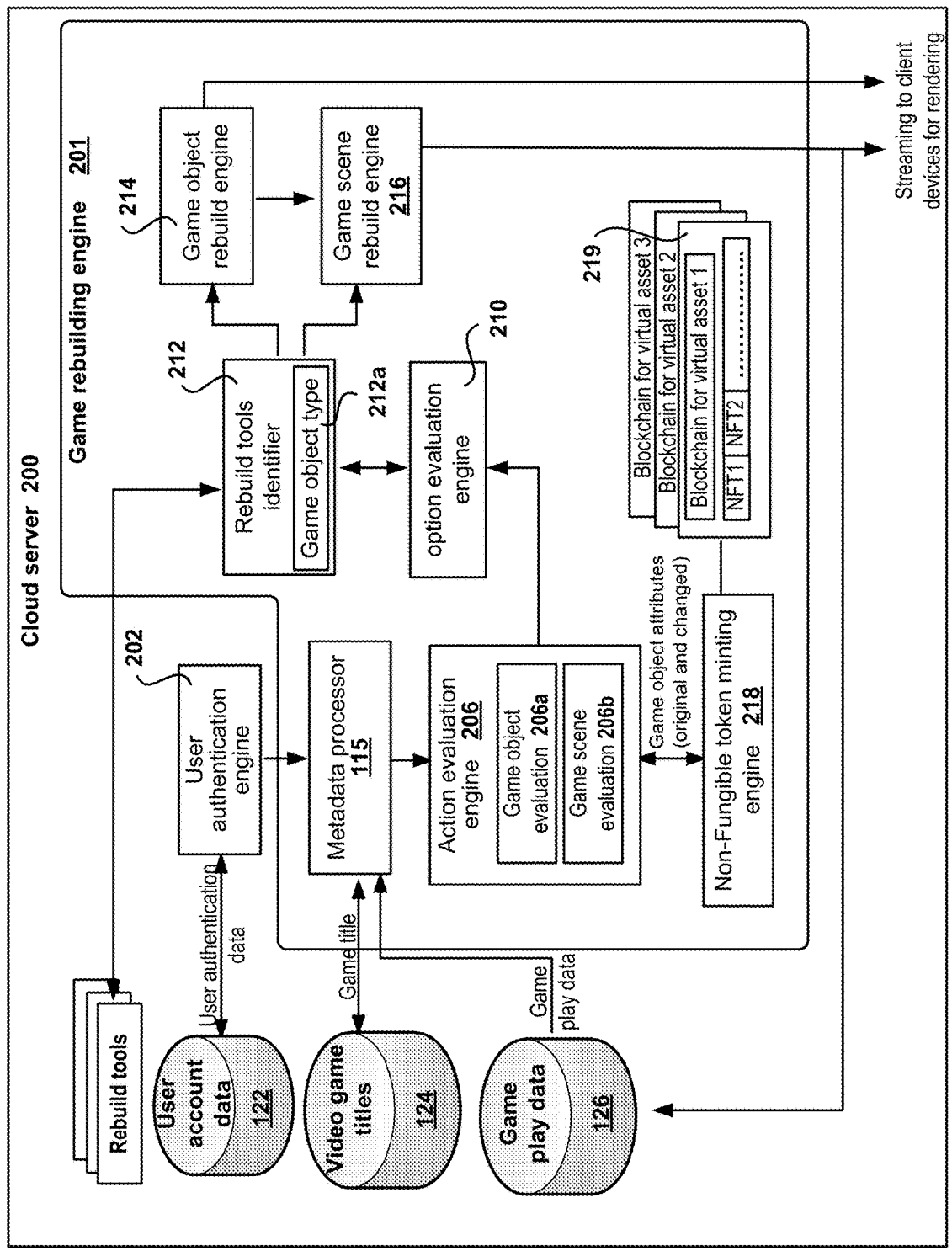
FIG. 2 illustrates various components of a game rebuilding engine used to provide the tools for rebuilding game objects and game scenes of a game world of a video game, in one implementation.

FIG. 2 identifies the various components of the game rebuilding engine 201 that are used to rebuild specific ones of the game objects and/or game scenes, in response to receiving a request for rebuilding one or more game objects at a server computing device (e.g., cloud server 200), in accordance with some implementations. The game rebuilding engine 201 can be integrated into the game logic of the video game or can be communicatively coupled to the game logic to allow free exchange of data between the game logic and the game rebuilding engine 201. Consequently, the game rebuilding engine 201 can execute on the same game server 101 as the video game or can execute on a cloud server 200 that is communicatively coupled to the game server 101. The changes defined and applied to the game objects as part of the rebuilding are communicated to the game logic. The game logic is designed to recognize the changes applied to specific ones of the game objects so that the rebuilt game objects are included in the game scenes when game play data is generated by the game logic. The game play data generated can be for a current game play session or a subsequent game play session. When the game play data is generated for the current game play session, then the changes to the game objects are reflected in subsequent game scenes.

As noted, a user requesting game play of a video game is first authenticated by the user authentication engine 202 prior to providing access to the video game for game play. The user is authenticated using user credentials provided during initial login to the video game server 101. The user credentials provided by the user are verified against user profile data stored in the user account datastore 122, wherein the user account datastore 122 stores user profile data of a plurality of users who have accessed or are authorized to access one or more of a plurality of video games hosted by the game server 101, wherein the game server 101 can be a cloud server 200. The verified user credentials and user profile data of the authenticated user are provided to the metadata processor 115 of the game rebuilding engine 201. In a multi-player video game, the verified user credentials and the user profile data of each user is used to identify the user providing specific game inputs. The metadata processor 115 also verifies that the authorized user has access to the video game selected by the user for game play by verifying the game title of the video game against the data stored in the game titles datastore 124.

Once the metadata processor 115 successfully verifies the user and the video game title accessed by the user, the metadata processor 115 processes the game play data for the video game retrieved from the game play datastore 126. The game play data stored in the game play datastore 126 captures the metadata for the video game and includes the game inputs, the interactions included in the game inputs, the actions initiated from these interactions, and the effect of such actions on different game objects within the various game scenes. The game play data can be from a current game play session of the user or from a prior game play session of the user. For example, the user may select the video game for resuming the game play from where they left off previously. The video game may be a single-player game or a multi-player game and the request to access the video game for resuming game play can be initiated by the single user or by plurality of users who were involved in the prior game play session. In the case of the current game play session, the game play data can be dynamically retrieved from the game play datastore 126 up to the point when a request for rebuilding is initiated. The metadata processor 115 then analyzes the game play data retrieved for the video game to identify game inputs provided by the one or more users and the characteristics of each of the game inputs. The characteristics of the game inputs can include user identifier providing the game input, type of game input provided, type of input device used to provide the game input, game scene including the game level where the game input is provided, action taken from the game input, game object(s) targeted, game object(s) impacted, amount of impact, etc.

The characteristics of the game inputs identified by the metadata processor 115 are provided as input to an action evaluation engine 206. The game inputs are interactions provided by the user or other users, or interactions initiated by game logic using game objects during game play. The action evaluation engine 206 identifies the action(s) initiated from each interaction and the game objects and game scenes impacted by the action(s). For instance, the action evaluation engine 206 engages a game object evaluation engine 206*a* to use the game state included in the game play data to, (a) identify each action resulting from interactions occurring in the game play, and (b) evaluate the impact of each action on each game object included in a game scene. The game object evaluation engine 206*a* first determines the game scene where the action is occurring, the game objects that are included in the game scene, the type of action occurring, the game objects (if any) used to generate the action, the game objects that are targeted by the action, extent of impact caused by the action, etc.

In some implementations, the extent of impact on each game object by each action is determined using attributes of the game object stored in the game play datastore 126. Each game object is associated with a plurality of attributes, wherein the attributes can be broadly classified into physical attributes and kinetic attributes. The original set of attributes of each game object defines the game object that is devoid of any wear (i.e., flaws or damages). As and when an action affects a game object, the impact on the game object is described with changes to the one or more attributes, wherein the amount of change from the original attributes reflects the amount of impact the action had on the game object. For example, when an action targets a game object, the impact of the action is represented as damage or wear on the surface of the game object. These damages or wear are captured as changes to one or more physical attributes of the game object affected by the action. For instance, an action can dent a particular portion of a surface of a game object. In response to the action, the physical attributes of the game object describing the particular portion are altered from the original state to an altered state, wherein the altered state includes the dent characteristics. The original state of the game object is defined to be the game object is devoid of any wear and the altered state is defined to be the game object that includes the wear (i.e., the dent, the above instance). The extent to which the physical attributes of the game object have to be altered, in response to the action, can depend on the physical and kinetic attributes of the game object. The game object can be defined to include physical attributes such as, type, material composition, size, shape, color, geometry, etc., and kinetic attributes, such as, stationary or moving, if moving, direction, speed, trajectory of movement, to name a few. The physics engine within the game logic takes into consideration these attributes of each game object to determine the impact of each action on the corresponding game object and generates the game state to incorporate the changes in the physical and kinetic attributes of the game objects involved in each action accordingly. The game state generated during game play identifies the wear on the game object impacted by each action and the game object evaluation engine 206a assesses the damage (i.e., computes the extent of wear) on each game object as the difference between the original attributes and the altered attributes resulting from impact of the action on the game object, wherein the altered attributes include the attributes defining the wear or damage inflicted.

Additionally, a game scene evaluation engine 206b is engaged by the action evaluation engine 206 to evaluate each game scene affected by each action to determine the extent of impact the action had on the overall game scene. In some implementations, the extent of impact of each action on the overall game scene is computed as a cumulative extent of impact on each game object affected by the action within the game scene. The attributes of the game objects in each game scene for each game play of the video game are stored and retrieved from the game play datastore 126 and are used to determine the impact of each action occurring in each game scene on each game object and on the overall game scene. The attributes (both physical and kinetic) of each game object in the video game are tracked to determine the amount of change the game object undergoes during gameplay due to interactions occurring in the video game that target the game object.

In some implementations, a non-fungible token (NFT) is generated for each game object included in each game scene of the video game. In alternate implementations, the NFT is generated for game asset associated with a user, wherein the game asset is a game object, such as a weapon, a tool, an object, etc., used by the user to interact in the game scene. The NFTs are used to track the game objects during gameplay of the video game. In some implementations, only the game assets associated with each user are tracked using the NFTs. In such implementations, the game assets with the NFTs are available for rebuilding. In other implementations, every game object included in each game scene, including the game assets associated with each user, is used to generate NFTs and, in such implementations, any or all of the game objects are available for rebuilding. A non-fungible token (NFT) minting engine 218 is engaged by the game rebuilding engine 201 to generate and update the NFT for each game object that is being tracked. The NFT for each game object is generated to include the original attributes of the game object and is updated when changes to one or more of the original attributes of the game object are detected during gameplay. The NFT minting engine 218 uses any publicly available or a proprietary blockchain to mint the NFT for each game object. In some implementations, the NFT minting engine 218 requests and receives the attributes of each game object from the metadata processor 115 to generate and update the blockchain of the respective game object. In some implementations, the NFT of each game object (i.e., virtual asset) is stored in a distinct blockchain 219 and as and when the game object is involved in an interaction occurring in the video game, the NFT for the virtual asset (i.e., the game object) is updated in the corresponding blockchain 219 so as to keep track of the game object's use in the video game. Each entry in the blockchain is generated to represent a change in the one or more attributes of the game object resulting from the game object being involved in the interaction. In some other implementations, the NFTs of each game object included in the video game (i.e., virtual asset) are stored together in a blockchain maintained for each video game. In such implementations, each video game is represented by a distinct blockchain where the original attributes and changes to the original attributes of each game object used in the video game are maintained and tracked. The NFTs are useful in keeping track of each game object even when the game object is transferred from one platform to another platform and from a first video game to a second video game. In some implementations, the changes occurring to the game object in the second video game can be easily transferred back to the first video game, if needed, so that the game object can present the most current look and feel in the first video game.

The data including the various game objects and the game scenes affected by each action occurring during gameplay of the video game identified by the action evaluation engine 206 are provided as inputs to an option evaluation engine 210. The option evaluation engine 210 evaluates the extent of impact each action has/had on the different game objects to determine if the extent of impact on the one or more game objects exceeds a predefined threshold. When the one or more game objects exceed the predefined threshold, the option evaluation engine 210 identifies one or more options for presenting to the user for rebuilding the game objects and/or the game scenes. In some implementations, the predefined threshold set for rebuilding the game objects may be game object specific (i.e., each game object can have a distinct threshold value for the wear to exceed and it can be defined based on the game object type), or user specific, or video game specific.

In some implementations, the option evaluation engine 210 may rely on the status of the user when providing the options to rebuild. For example, when the user reaches a specific level in the video game, the user may be provided with the options to rebuild one or more game objects. For instance, when the user reaches a specific skill level (e.g., expert level) or game level, or when the user earns a predefined amount of game assets, or overcomes a predefined type or a predefined number of challenges (e.g., defeats a monster or captures a castle or defeats a certain number of game characters associated with other users), the user is provided with the option of rebuilding one or more game assets. In other instances, the option to rebuild certain ones of the game objects may be provided to the user when they are at a novice level, so as to allow them to continue to play the video game, in order to continue to capture their interest in the video game.

In some implementations, the option to rebuild may be provided to the user when the game assets (i.e., game objects used by the user to provide interactions) associated with the user are detected to experience a predefined amount of wear. In other implementations, the option to rebuild may be provided when one or more of the game objects (including or excluding game assets of the user) are detected to experience a predefined amount of wear (e.g., greater than 30%-40% wear). In some implementations, a plurality of options are provided to the user for rebuilding, including a first option to rebuild a specific game object (e.g., a game asset) of the user that is used or targeted mostly in the game scene, a second option to rebuild a specific set of game objects (e.g., the game assets of the user or a specific subset of the game objects), and a third option to rebuild all of the game objects in a game scene. Additional options, such as rebuilding a specific game scene (e.g., where a particular monster was defeated) or a specific set of game scenes (e.g., game scenes where the user chased a particular monster and the game scene where the user finally defeated the monster, or the game scenes where the monster attacked specific game objects and inflicted certain amount of damage (i.e., wear) and the game scene where the monster was captured (i.e., defeated)) can also be provided. FIGS. 4A-4D represent the various options provided by the option evaluation engine 210 to the user and will be described in detail further below.

In response to the user selecting a particular option to rebuild, a rebuild tools identifier engine 212 is used to identify the various tools that has to be provided to the user to allow the user to specify the changes in the game object. In some implementations, the rebuild tools identifier engine 212 determines the type of game object to rebuild in order to identify the appropriate tools for rebuilding the game object(s). In some implementations, the game object can be a game scene object, such as a building, or a tree or a castle or a bridge that is part of a scene that is selected for rebuilding. In such cases, appropriate tool(s) to rebuild the game scene object are identified and provided to the user. In alternate implementations, the game object that is being rebuilt can be a game asset, such as a weapon or tool, that was damaged due to continued use in the video game or due to damage caused by an action from another user or game character (e.g., monster), or a game character representing the user in the video game. Based on the type of game object selected for rebuilding, appropriate tools are identified and presented to the user to allow the user to rebuild the specified game object. In some implementations, each game object is a virtual game object used to interact with one or more game characters associated with other users or one or more other game object or is a virtual game object that is part of a game scene.

The tool(s) identified by the rebuild tools identifier engine 212 are provided to a game object rebuild engine 214 and/or a game scene rebuild engine 216. In some implementations, the tools provided for rebuilding the game objects can be different from the tools provided for rebuilding the game scene. In alternate implementations, the tools provided to rebuild the game objects are also configured to rebuild the game scenes. The game object rebuild engine 214 uses the identified tool(s) to rebuild the specific ones of the game objects selected by the user for rebuilding from an option menu provided by the option evaluation engine 210. As part of rebuilding, the game object rebuild engine 214 generates a corresponding rebuilt game object for each game object selected for rebuilding. In some implementations, the tool allows the user to specify changes to one or more attributes of the game object as part of rebuilding. In some implementations, the game object rebuild engine 214 is a program tool that is configured to identify the game object selected for rebuilding, identify and list the original and current attributes of the identified game object, and an option to change the current attributes to the original attributes. In some implementations, finer control of changing specific ones of the attributes is accomplished by providing additional options that allow the user to select specific ones of the attributes to change from current attributes to the original attributes when rebuilding the game object. For example, the user may want to continue to exhibit a portion of damage or wear on a particular game object as a trophy (or proof) to prove that they defeated a particular monster (e.g., dinosaur) after having the monster inflict certain amount of damage on the game object (e.g., deep claw marks). In this case, the game object may be a game character representing the user. To achieve this objective, the user is provided with additional options that allow the user to control which ones of the attributes the user wishes to change to original attributes and which ones of the attributes the user wants to retain as the current attributes. In this example, even when the user selects to keep certain ones of the current attributes, the attributes selected by the user for changing, when applied to the game object, are sufficient to reduce the wear (i.e., damage) exhibited by the game object to be well within the predefined threshold. As part of rebuilding the game object, the user selection of the options and additional options are used by the game object rebuild engine 214 to adjust the specific ones of the attributes of the game object to generate a rebuild game object. The program tool for rebuilding is one type of tool provided for rebuilding the game object(s) for the user is provided as an example and that other types of tools can also be envisioned.

In addition to the game object rebuild engine 214 for rebuilding the game object(s), the rebuild tools identifier engine 212 engages a set of tools to rebuild a particular game scene of the video game where the game objects have exhibited wear that exceeds the predefined threshold. A game object can be a game asset associated with the user (e.g., weapon, tool, etc.), that is used in more than one game scene of the video game. As the game asset is involved in more and more interactions in the various game scenes during game play, depending on the game asset's attributes, the game asset can start exhibiting wear that progressively increases over time. Thus, there can come a time during gameplay when the wear on the game asset exceeds the predefined threshold. The time when the wear of the game asset exceeds the predefined threshold can be correlated to a particular game scene and such correlation can be done using a gameplay timeline. Aside from the game asset, the video game can include game objects that are part of different game scenes of the video game, wherein a game object can appear in more than one game scene. The game objects included in each game scene can be static game objects, moving game objects, game objects that are part of a background scene, game characters of other users that are playing the game simultaneously with the user, etc.

The interactions occurring in a game scene of the video game initiate actions that can affect one or more of the game objects within the game scene. A level of impact of each action on each game object within the game scene depends on the type of action performed and the game object used to perform the action. As more and more game objects within the particular game scene start exhibiting wear that exceeds the predefined threshold, the game scene rebuild engine 216 is engaged to rebuild the particular game scene using the tools identified by the rebuild tools identifier engine 212, in some implementation. In addition to the tools to rebuild the game scene, the rebuilt game objects for the one or more game objects exhibiting wear are also provided by the game object rebuild engine 214 to the game scene rebuild engine 216. The tools are used to identify the game objects that exhibit wear exceeding the predefined threshold, identify the corresponding rebuilt game objects generated by the game object rebuild engine 214, and replace the game objects with the corresponding rebuilt game objects.

In some implementations, replacing the game objects within the particular game scene includes relocating one or more of the game objects from an existing location to a new location within the particular game scene. In some implementations, the rebuilding of the particular game scene is automatically initiated when the number of game objects exhibiting wear greater than the predefined threshold within the particular game scene exceeds a predefined number. In alternate implementations, the particular game scene is rebuilt when the user selects the option from an options menu presented by the option evaluation engine 210. As the game objects are rebuilt, the NFTs of the corresponding game objects are updated to include the attributes of the rebuilt game objects, which can reflect the original game attributes that the corresponding game objects started with. The NFTs keep track of the history of changes in the various attributes of each game object as the various game objects are used in the video game during game play. The rebuilt game objects are stored in the game play datastore 126 and used during subsequent gameplay of the video game. The game logic of the video game is designed to recognize the rebuilt game objects and the rebuilt game scene(s) when generating game play data for subsequent interactions occurring in the video game. Where the rebuilding is done after a current gameplay session is completed and the video game is paused, the rebuilt game objects and the rebuilt game scenes are used during subsequent game play sessions, when the video game is resumed and the game play data generated for the resumed game play reflects the changes.

In some implementations, the game objects may be rebuilt during a current play session. In such implementations, the identifying and rebuilding is done dynamically, based on the option(s) selected by the user from the options menu provided by the option evaluation engine. The rebuilt game objects and game scenes are used to generate the subsequent game play data that is streamed to client device of the respective users.

As noted previously, in some implementations, the game objects that are rebuilt for a particular game scene can include the game assets associated with a particular user, select ones of the game objects or all of the game objects in the particular game scene. The option to rebuild select ones of the game objects can be initiated by a particular user, wherein the select ones of the game objects can be game assets of the particular user. Alternately, the particular user can select a particular group of game objects for rebuilding, wherein the particular group of game objects is associated with a select group of users that are part of a team. The various options allow the user to rebuild game objects and game scenes and provide the necessary tools to specify the changes that are then applied to the game objects as part of rebuilding. The rebuilt game objects are devoid of any wear or significant part of the wear and can be reused during subsequent gameplay of the video game. The options and tools allow each user to play an active role in shaping and building the game world by redesigning the game objects and the game scenes.

In some implementations, the option to rebuild the game objects and game scenes are provided upon detecting the user being in control of the video game within a particular game scene. The user is considered to be in control when the user has completed all the challenges in the particular game scene, or defeated or captured an adversary (i.e., opponent) within the particular game scene, or gets possession of a particular game asset, etc. In response to detecting the user being in control of the video game in the particular game scene, the user is provided with the option(s) to rebuild the game objects and game scenes that include the game objects that show wear exceeding a predefined threshold. In some implementations, the user can be provided with incentives to rebuild one or more game objects and game scenes. The incentives can be customized based on the game play status of the user in the video game. For example, if the user is an expert user, then the user is provided with incentives to rebuild the game object. The incentive can be game-related incentive or monetary incentive. In some implementations, the game-related incentives can be any one or more of additional game asset, a game token, a virtual key usable in the game world to unlock game levels or game scenes or game assets, etc. The monetary incentives can be real currency or game currency/game tokens usable in the video game.

Figure 3A:
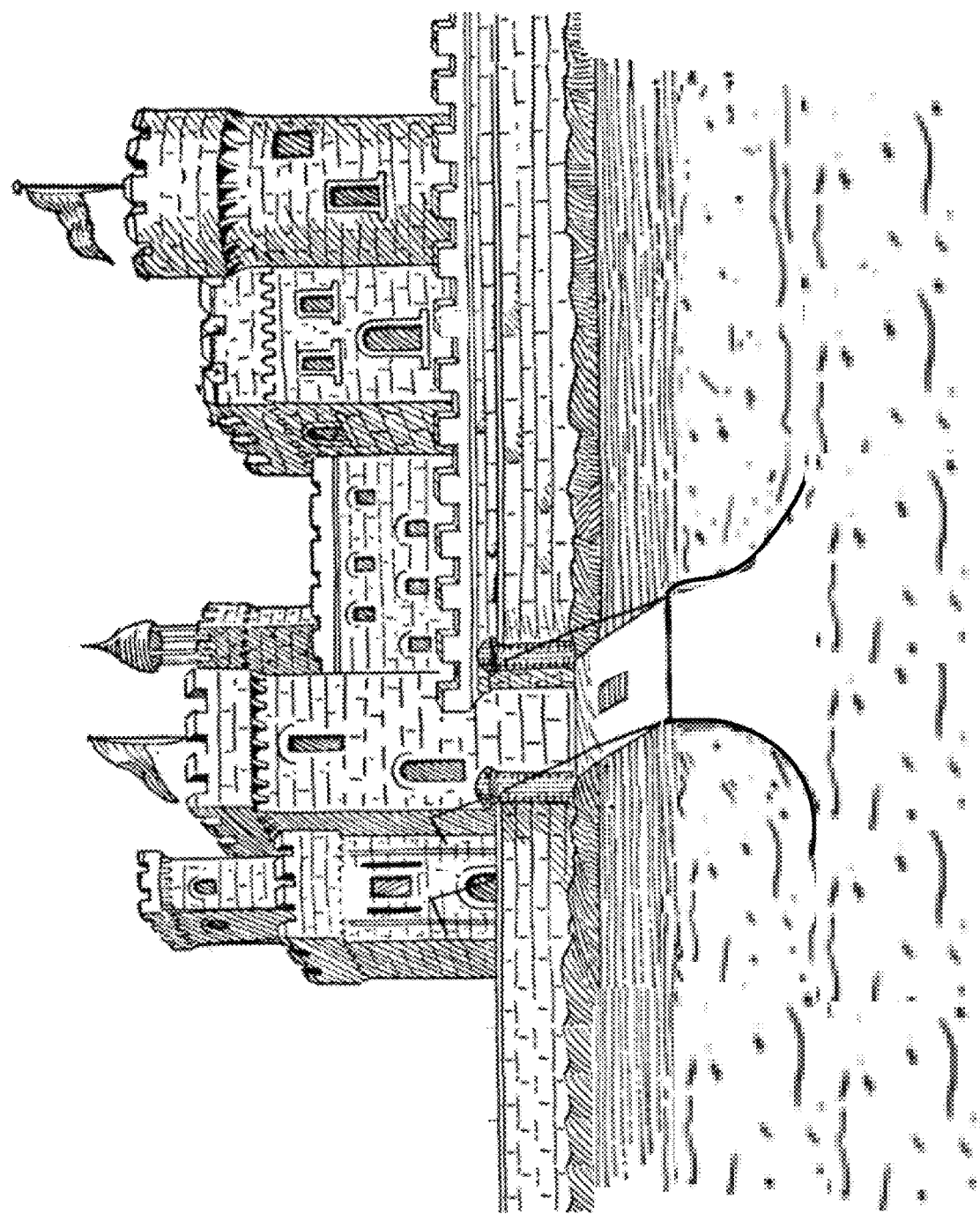
FIG. 3A illustrates a simplified view of a game scene before receiving any interaction, in one implementation.
Figure 3B:
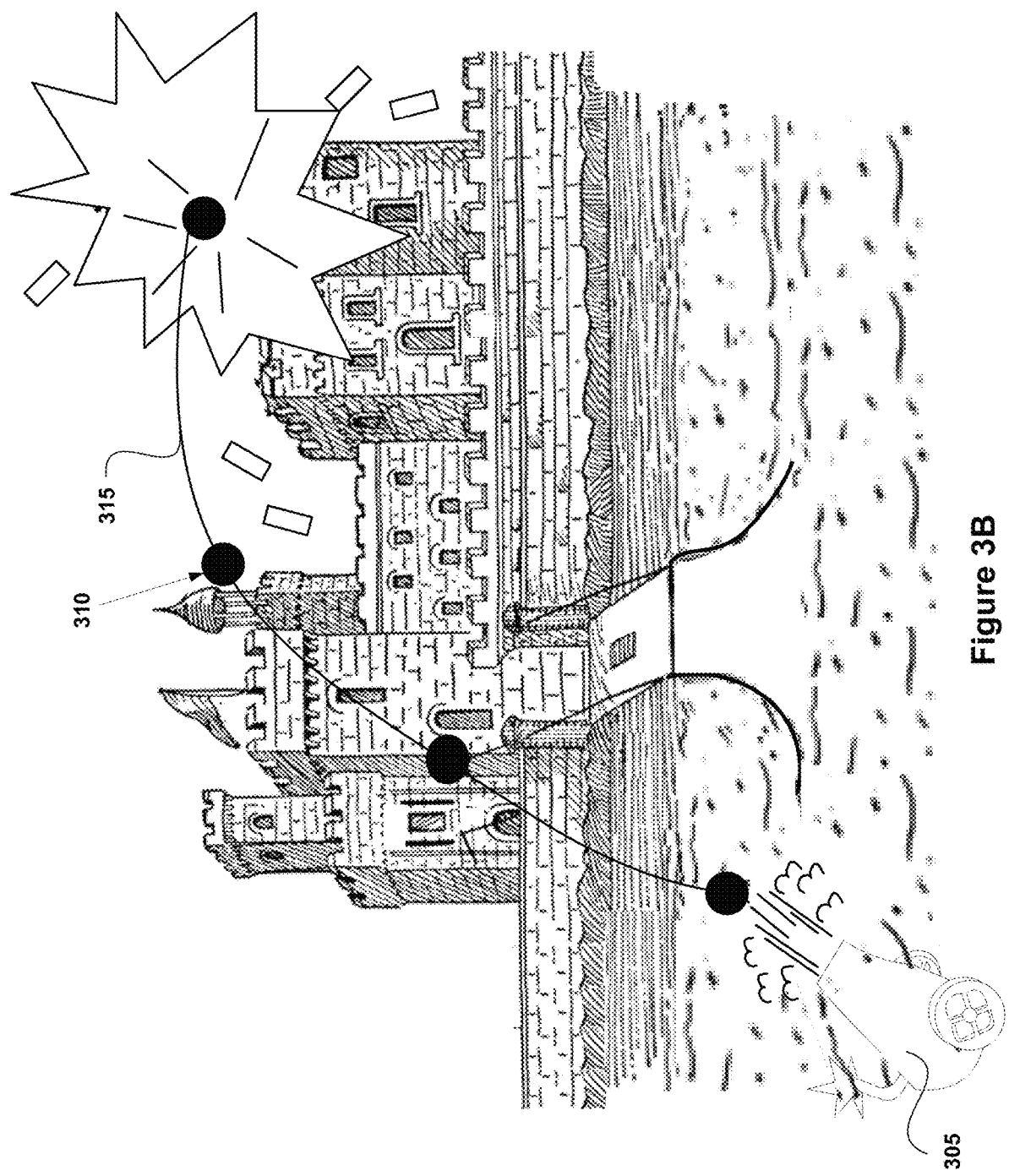
FIG. 3B illustrates the game scene illustrated in FIG. 3A when an action occurs from an interaction resulting in damage to game objects in the game scene, in one implementation.
Figure 3C:
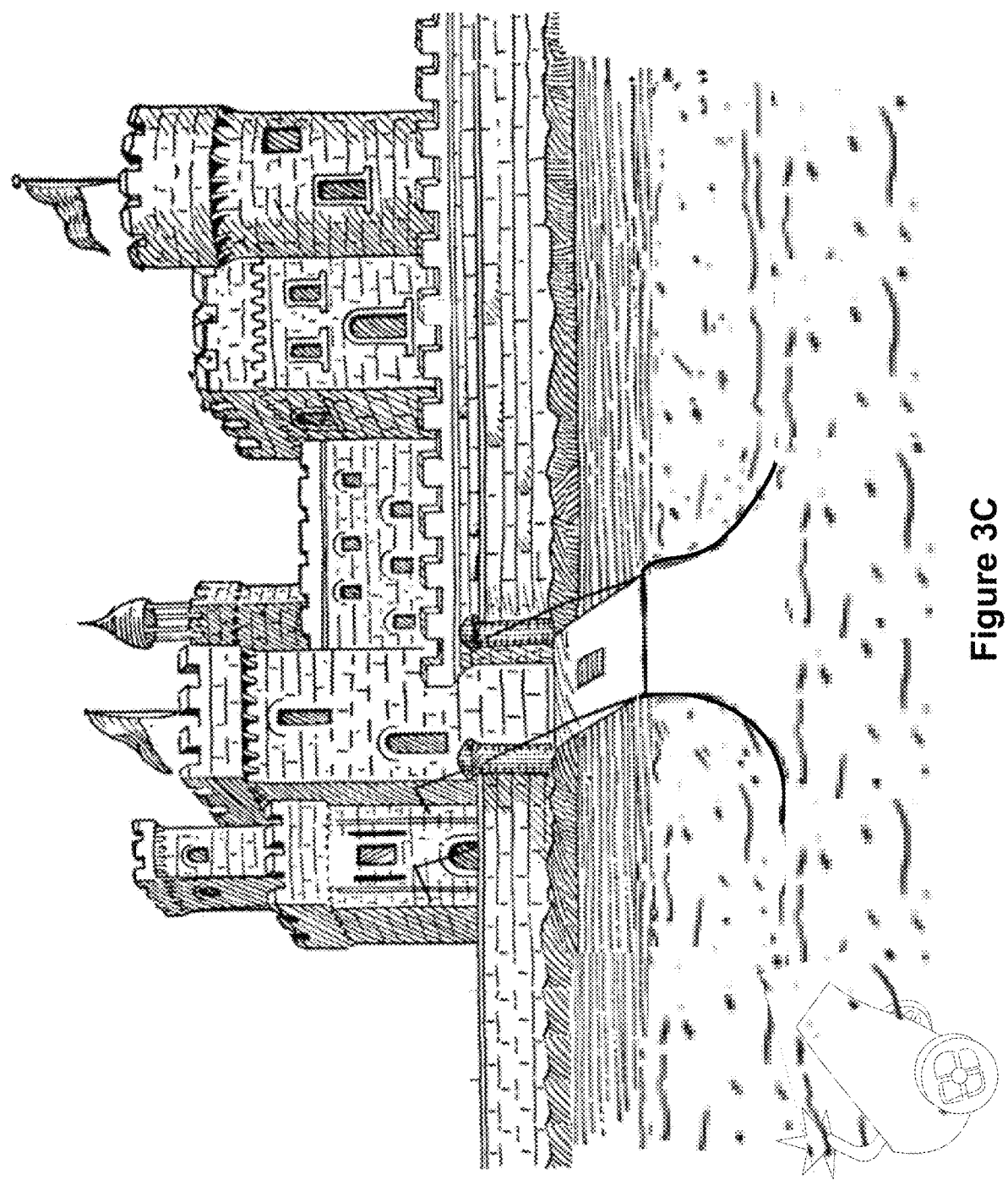
FIG. 3C illustrates the game scene that is rebuilt using one or more tools to specify and apply changes to the game objects in the game scene to cause the game objects to be devoid of any wear, in one implementation.

FIGS. 3A-3C illustrate an example of rebuilding a game scene based on level of wear exhibited by the game objects that up the game scene of a game world of a video game, in some implementations. FIG. 3A illustrates a game scene in which a castle (i.e., game object) is shown with a moat surrounding the castle. A drawbridge over the moat provides access to the castle from a pathway that extends from the drawbridge out on to a land on the other side of the moat. In this example implementation, the game object (i.e., castle) itself is a game scene. Consequently, any damage inflicted on the game object affects the game scene and the extent of the damage inflicted on the game object is equal to the extent of wear of the game objects in the game scene. As part of interaction, a cannon 305 (i.e., a game object) is used to attack the castle, as illustrated in FIG. 3B. The cannon 305 can be controlled by a game character of a user or can be controlled by game logic as part of progression of gameplay of the video game. As illustrated, the cannon 305 is shown to have launched a cannon ball 310 along a trajectory 315. The trajectory 315 results in the cannon ball 310 hitting a portion of the castle and destroying it (i.e., wear on the castle—a game object), as illustrated by loose bricks flying in the air. The user or the game rebuild engine can initiate rebuilding of the game object and, as a result, the game scene represented by the game object by selecting a rebuild option provided by the options evaluation engine 210. FIG. 3C illustrates the resulting rebuilt game object/game scene generated when the game object is rebuilt. As the castle represents both the game object and the game scene, the resulting game scene is devoid of any damage. The rebuilt game object is stored in the game play datastore 126 and used during subsequent gameplay of the video game.

Figure 4A:
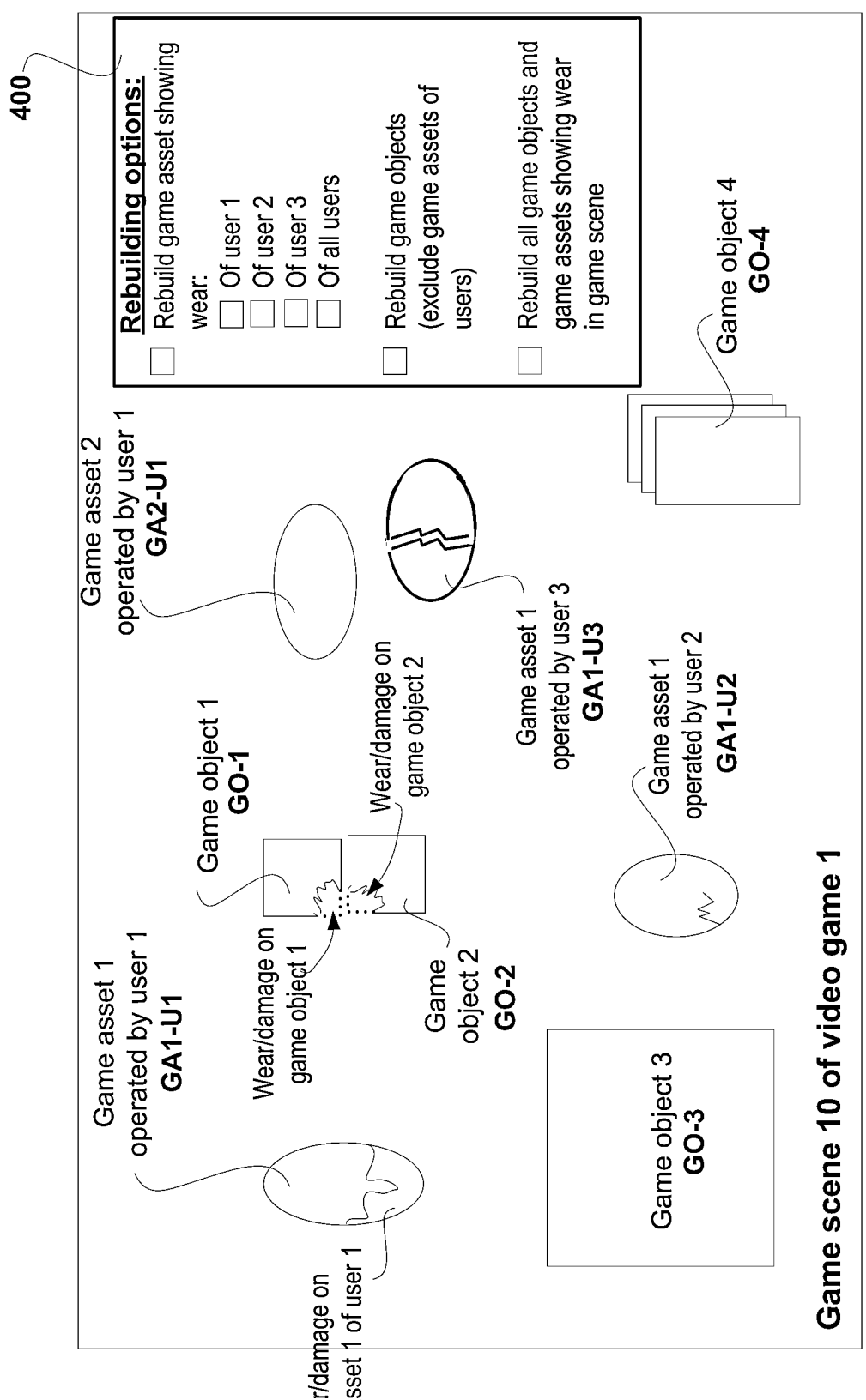
FIG. 4A illustrates a sample game scene in which a plurality of game objects are disposed with some of the game objects showing some wear and a plurality of options available for rebuilding the game objects, in accordance with one implementation.

FIGS. 4A-4D illustrate the various provided by the options evaluation engine 210 for rebuilding the game objects included in one or more game scenes of a video game, in some implementations. FIG. 4A illustrates a sample game scene (game scene 10) of a video game (video game 1). The sample game scene 10 includes a plurality of game objects that can be part of the game scene 10 including a plurality of game assets operated by different users and the game objects that are part of the sample game scene 10. For example, the sample game scene 10 includes game asset 1 operated by user 1 (GA1-U1) that includes a damage (i.e., wear) running across a portion of a lower half of the game asset 1 of user 1, game object 1 (GO-1) showing wear at a lower left corner, game object 2 (GO-2) showing wear at an upper left corner, game asset 2 operated by user 1 (GA2-U1) showing no wear, a game asset 1 operated by user 3

(GA3-U1) showing wear running all the way along a middle section, a game asset 1 operated by user 2 (GA2-U1) showing some wear along a lower left portion, a game object 3 (GO-3) showing no wear, and game object 4 (GO-4), which can be a collection of game objects, such as trees or hill range, or buildings within a block, etc. The game assets and objects are shown with generic geometric shapes (e.g., ovals, squares, rectangles), whereas in reality they can have any shape, size, structure, etc., depending on the context of the game scene 10. For example, the game assets and game objects can be weapons or tools used by the users when providing interactions during game play of the video game, or could be game characters representing users or adversaries (opponents), or game objects that are part of the game scene, and hence can be of any shape, size or structure. Based on the wear exhibited by the different game objects (game objects and game assets), a rebuilding options menu 400 is presented by the options evaluation engine 210. The rebuilding options menu 400 can be a pop-up menu rendered with the game scene or can be a separate pop-up window rendered over a portion of the game scene or any side of the game scene. The rebuilding options menu 400 is activated and rendered dynamically in response to detecting a number of game objects showing an amount of wear that exceeds a predefined threshold, wherein the number of game objects exhibiting such amount of wear is at least equal to or greater than a predefined number/value (e.g., greater than 20%-30% of the game objects in the game scene 10). The number and type of options provided to a user for rebuilding can be based on the game scene (game scene 10 in the above example) and can be driven by the type, number and amount of game objects (including game assets of users) that are present in the game scene, the type and amount of damage exhibited by each game object (including user-associated and non-user-associated game objects) and the type and amount of damage in the overall game scene. Thus, based on the type and number of game objects present in the game scene 10 shown in FIG. 4A, the rebuilding options menu 400 includes a first option to rebuild a particular user's game assets that show wear, a second option to rebuild the game objects in game scene 10 that shows wear, wherein the game objects in the game scene excludes the game assets of the users, and a third option to rebuild all the game objects and game assets showing wear within game scene 10.

Figure 4B:
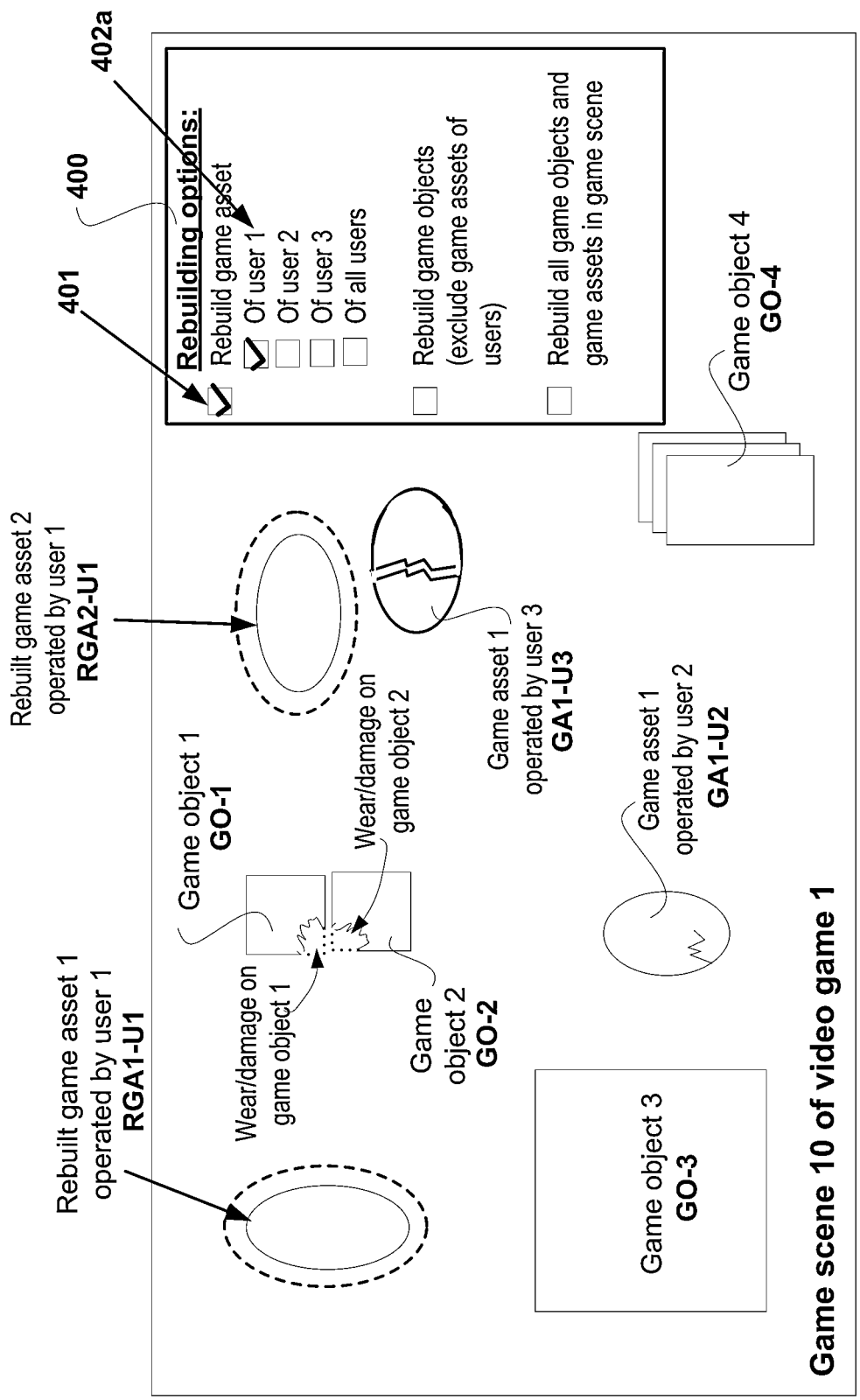
FIG. 4B illustrates the sample game scene of FIG. 4A where an option to rebuild game assets of a first user is selected and the rebuilt game assets of the selected first user that are devoid of any wear, in accordance with one implementation.

FIG. 4B illustrates the same game scene 10 shown in FIG. 4A with rebuild options selected by user 1, in one implementation. As depicted, user 1 has selected the first option to rebuild game assets, as shown by a check mark in check box 401, and has selected a particular user's game assets (i.e., user 1's game assets) for rebuilding, as shown by check mark in check box 402a. In response to the user (e.g., user 1) selecting the option to rebuild the game assets of user 1, the game assets of user 1 are identified (game assets 1 and 2 operated by user 1), wear of the game assets 1 and 2 of user 1 are evaluated to verify that the wear exceeds a predefined threshold, and upon successful verification, the game assets 1 and 2 of user 1 (GA1-U1, GA2-U1) are rebuilt to generate rebuilt game objects RGA1-U1 and RGA2-U1 operated by user 1, as shown by the dashed ovals around the corresponding game assets associated with user 1. It should be noted that the game assets of other users are left untouched. In some implementations, the option to rebuild the game asset of a specific user is provided when the user is at a specific level in the video game. In alternate implementations, the option to rebuild the game asset(s) of the user is provided when the game asset(s) of the user shows wear that is greater than the predefined threshold. The rebuilt game assets RGA1-U1 and RGA2-U1 are devoid of any damage or wear and the attributes of the rebuilt game assets RGA1-U1 and RGA2-U1 reflect this change. The rebuilding of game assets of user 1 would be in accordance to the changes specified by user 1, wherein the changes to the game assets operated by user 1 are applied to the game assets of user 1 showing wear to generate corresponding rebuilt game assets devoid of any wear. In some implementations, the changes are applied to the game assets by updating the respective attributes.

Figure 4C:
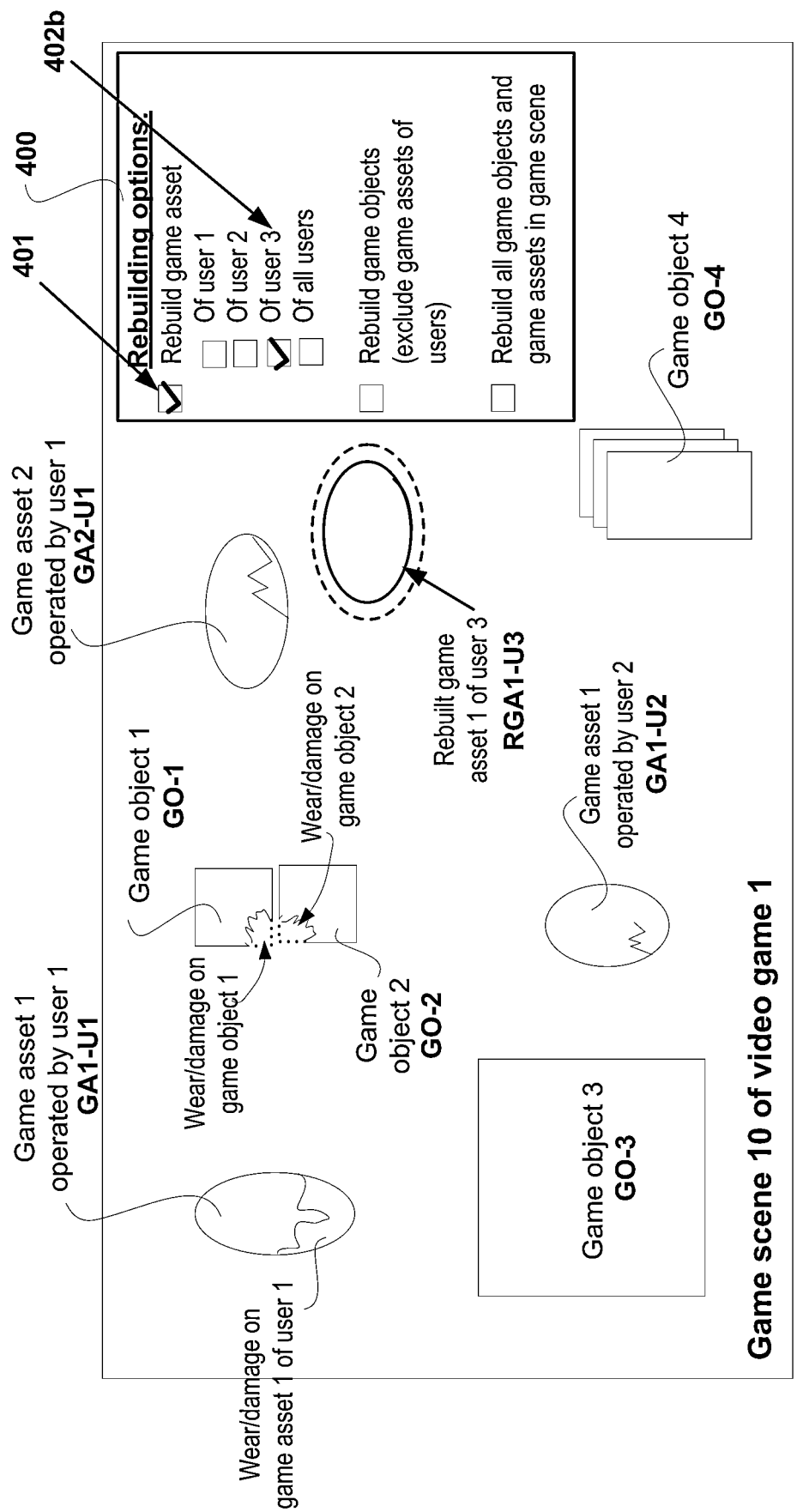
FIG. 4C illustrates the sample game scene of FIG. 4A where an option to rebuild game assets of a second user is selected and the rebuilt game asset of the selected second user that is devoid showing wear are rebuilt, in accordance with one implementation.

FIG. 4C illustrates a sample game scene 10 with the game objects and game assets of a plurality of users exhibiting wear and a rebuilding options menu 400 that provides the various options to a user to rebuild the game assets and/or game objects, in some implementations. The rebuilding options menu 400 includes options that are similar to what was shown in FIG. 4B. In FIG. 4C, the option to rebuild game asset is selected as shown by a check mark in check box 401 and the sub-option of rebuilding game assets of user 3 is selected as shown by a check mark in check box 402b. As with the option of rebuilding game assets of user 1 illustrated in FIG. 4B and described above, the selection of check box 402b results in identifying game asset(s) of user 3 (i.e., GA1-U3), evaluating the amount of wear of the game asset(s) of user 3 to determine if the wear exceeds the predefined threshold defined for the game assets, and upon successful verification, rebuilding the game asset(s) of user 3 to generate rebuilt game asset(s) (RGA1-U3), as shown by dotted line surrounding RGA1-U3 in FIG. 4C. The option of rebuilding game assets of user 3 can be initiated by user 1 or user 3 or by game logic upon detecting wear of game assets of user 3 exceeding the predefined threshold. In some implementations, user 3 can be on the same team as user 1 and user 1 can be the team leader or have achieved a certain level and is provided with the capability of rebuilding the game assets of the team, including their own game assets and game assets of other users in the team.

Figure 4D:
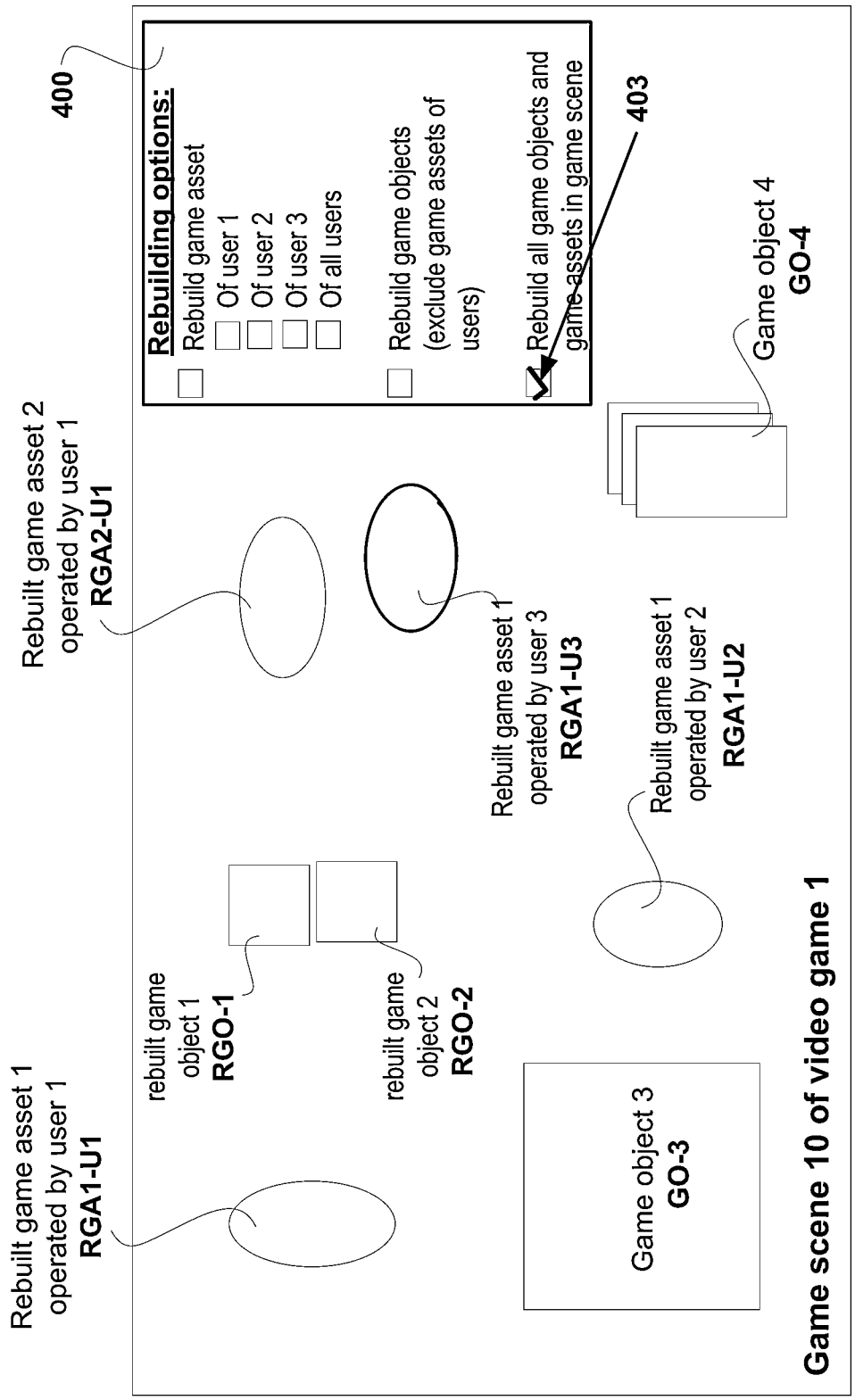
FIG. 4D illustrates the sample game scene of FIG. 4A where an option to rebuild all the game objects including all the game assets of all users that show wear, is selected and the resulting sample game scene with all the rebuilt game objects that are devoid of wear, in accordance with one implementation.

FIG. 4D illustrates a sample game scene 10 represented in FIG. 4A showing rebuilding options menu 400 presented for user selection, in some implementations. The options provided in the rebuilding option menu 400 are similar to what was shown in FIGS. 4B and 4D. In the implementation illustrated in FIG. 4D, the option to rebuild all game objects, including game assets included in the game scene 10 that show wear is selected, as shown by check mark in check box 403. In response to the user selection of the check box 403 for rebuilding all the game objects in the game scene 10, including all the game assets of the plurality of users showing wear, the game objects and game assets of different users are identified, the amount of wear of each game object/game asset is evaluated to determine if the wear exceeds the predefined threshold, and upon successful verification each of the game object including each game asset of each of the plurality of users is rebuilt to generate the rebuilt game objects/game assets for game scene 10. Thus, game assets 1 and 2 operated by user 1 (GA1-U1, GA2-U1) are rebuilt to generate rebuilt game assets RGA1-U1, RGA2-U1, game objects 1 and 2 (GO-1, GO-2) are rebuilt to generate rebuilt game objects RGO-1 and RGO-2, game asset 1 of user 2 (RGA1-U2) is rebuilt as rebuilt game asset RGA1-U2, and game asset of user 3 (RGA1-U3) is rebuilt as RGA1-U3, wherein each of the rebuild game objects/game assets are devoid of wear, as shown in FIG. 4D. Since game objects GO-3 and GO-4 did not shown any wear at the time when the check box 403 was selected by the user, the game objects GO-3 and GO-4 are left untouched. The rebuilt game assets and game objects are updated to the game play datastore 126 for subsequent use when the game play of the video game is resumed during current or subsequent gameplay sessions. Updating to the game play datastore 126 includes updating the attributes of the game assets and the game objects of the game scene 10 to reflect the rebuilt attributes. In some implementations, the rebuild attributes could be the same as original attributes of the respective game objects/game assets that are devoid of wear. Further, the attributes of the rebuilt game assets and game objects are updated to the respective NFTs so that the use of the game assets and game objects in the video game can be tracked. Since the game assets and game objects can be transferred from one video game to another video game, any changes occurring in the video game can be carried over (i.e., transferred) to the other video game and vice versa. Similarly, since the game assets and game objects can be transferred from one platform to another platform, any changes occurring in the video game on one platform can be updated to the video game executing on the other platform and vice versa.

In some implementations, keeping track of the attributes of the various game objects used in the video game and the wear on the one or more game objects resulting from interactions occurring in the video game, providing appropriate options to rebuild, and identifying appropriate tools for carrying out each of the rebuild options to rebuild the one or more game objects can be accomplished using machine learning (ML) engine (not shown). The ML engine can be designed to build an artificial intelligence model for each game scene, for example, to keep track of the state of each game object disposed therein, the interactions occurring in the game scene, the actions resulting from such interactions, the effect of such actions on certain ones of the game objects targeted, and the current attributes of the various game objects including attributes of wear caused by such interactions. The ML engine then uses the details from such tracking to identify the various rebuild options available for the user to allow the user to select the specific ones of the game objects to rebuild and appropriate tools to carry out each of the rebuild options. The tools identified by the ML engine for the rebuild option selected by the user are provided to the user to specify changes to specific ones of the game objects. In response to the user specifying the changes to specific ones of the game objects, based on the option selected, the ML engine is further configured to identify the attributes of the specific ones of the game objects that need to be updated to incorporate the changes specified by the user. The changes are applied to the game objects by updating the identified attributes of the specific ones of the game objects. The resulting rebuilt game objects devoid of wear are updated to the game scene by replacing the existing game objects showing the wear with the rebuilt game objects devoid of wear. The game scene with the rebuilt game objects are used during subsequent gameplay of the video game.

To assist in rebuilding the game objects, especially for a live streaming game, for example, it is essential that the game rebuilding engine 201 has access to the most current game play data. The historic game play data and the most current game play data are stored in the game play datastore 126 and is continuously made available to the game rebuilding engine 201 for allowing the user to reconstruct some portion of the video game (e.g., rebuild one or more game scenes and/or rebuild one or more game objects used in one or more game scenes). The various options and tools provided to each user allow the user to get involved in shaping and rebuilding the game world, and in some cases, also allow the user to customize some of the game objects (e.g., game assets associated with the user) in accordance to their preference. Allowing the user to control some aspect of the design of some of the game objects used within a video game can improve the user's interest and engagement in the video game. Increase in the users' engagement and interest in the video game can be beneficial to a game developer as this can lead to increased demand and/or extended engagement in the video game. The game developer or game provider can use the increased user engagement in the video game to their advantage. For example, the game developer and/or game provider can monetize on the extended user engagement by inviting advertisers to advertise their ware or service on the game object itself or within the game scene where the game object is being rebuilt, for example. Similarly, the advertisers can take advantage of the increase in users' engagement in the video game by advertising their service or product. The advertisement can be for a real-world object/service. The real-world object or service can be related to the game object that is being rebuilt or to context of the video game in the game scene where the rebuilt game object is disposed. Alternately, the advertisements can be for promoting other objects or services of the advertiser. Thus, the user engagement can be exploited to provide a win-win opportunity for both the game developers/game providers and the advertisers. Additional advantages can be envisioned by one skilled in the art after reviewing the details of the various implementations.

Figure 5A:
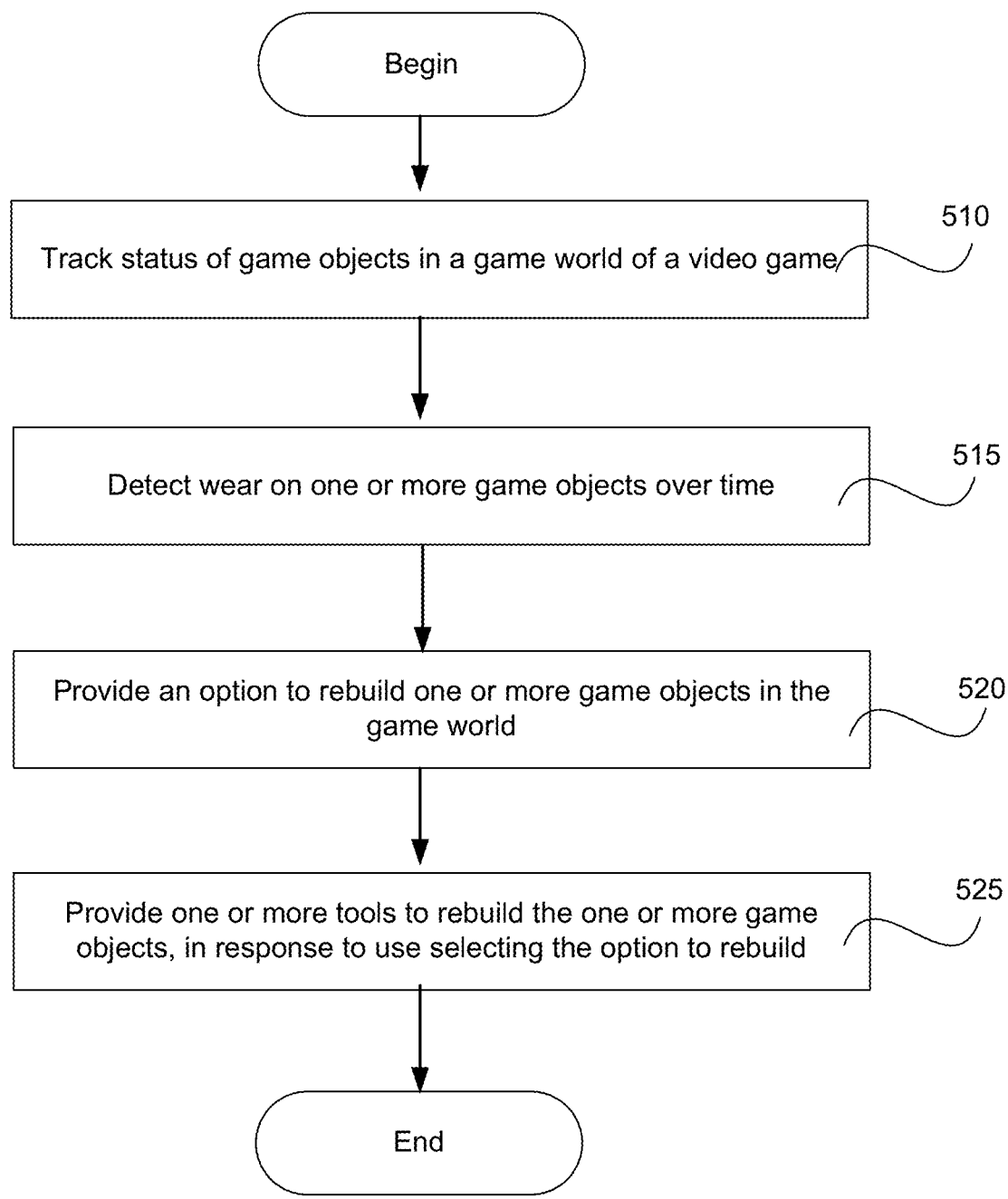
FIG. 5A illustrates a sample flow of operations of a method for rebuilding game world of a video game, in accordance with one implementation.

FIG. 5A illustrates flow of operations of a method for reconstructing a game world of a video game, in accordance with one implementation. The method begins by tracking status of each game object within a game world of a video game, as illustrated in operation 510. The game objects are used to define game scenes and can include both user associated game objects (i.e., game assets used by the user to provide game interactions) and game objects that are used to define game scenes. During gameplay, game interactions provided by the user and other users can affect the game objects causing wear. The game interactions can be interpreted to define actions that target one or more game objects within a game scene of the video game. As the game play progresses, the game objects are constantly exposed to actions resulting from the interactions occurring in the game scene. Such exposure results in some game objects exhibiting wear, wherein the amount of wear is proportional to the amount of exposure to the actions and the type and amount of impact each action has on the game objects.

The wear occurring on each game object exposed to the actions progresses over time, and is detected and tracked by the game rebuilding engine, as illustrated in operation 515. When the wear on each game object exceeds a predefined threshold, one or more options to rebuild the one or more game objects in the game world, is provided to the user, as illustrated in operation 520. The options to rebuild are provided in accordance to type of game objects that exhibit wear exceeding the predefined threshold. For instance, a game asset of a user used to provide interactions in the game world can exhibit progressively more wear as the game asset is used more and more to provide interactions. As a result, the option provided to the user can target the game asset(s) of the user for rebuilding. In another instance, a particular game object can be subjected to lot of actions (e.g., a treasure chest or a trophy room or a game monster) due to the particular game object being critical or important for progressing in the video game. In this instance, the game object, such as the treasure chest or trophy room, can be identified for rebuilding and an appropriate option is provided to the user for rebuilding the game object. In some implementations, a plurality of options is provided to the user, wherein each option targets a specific game object or group of game objects.

In response to the user selecting an option for rebuilding, appropriate tools are provided to the user to specify changes to the game objects identified in the selected option, as illustrated in operation 525. The user can use the selected tools to specify changes that they would like to see in the object when the game object is rebuilt, and such changes can include user's customization. The changes specified by the user are collected and applied to the identified game object to generate a corresponding rebuilt game object that is used to replace the game object showing wear in the game scene within the game world of the video game. The rebuilt game object is devoid of any wear. The rebuilt game object and the game scene with the rebuilt game object incorporated therein are stored in the game play datastore 126 and made available for subsequent game play within a current game play session or for subsequent game play sessions.

Figure 5B:
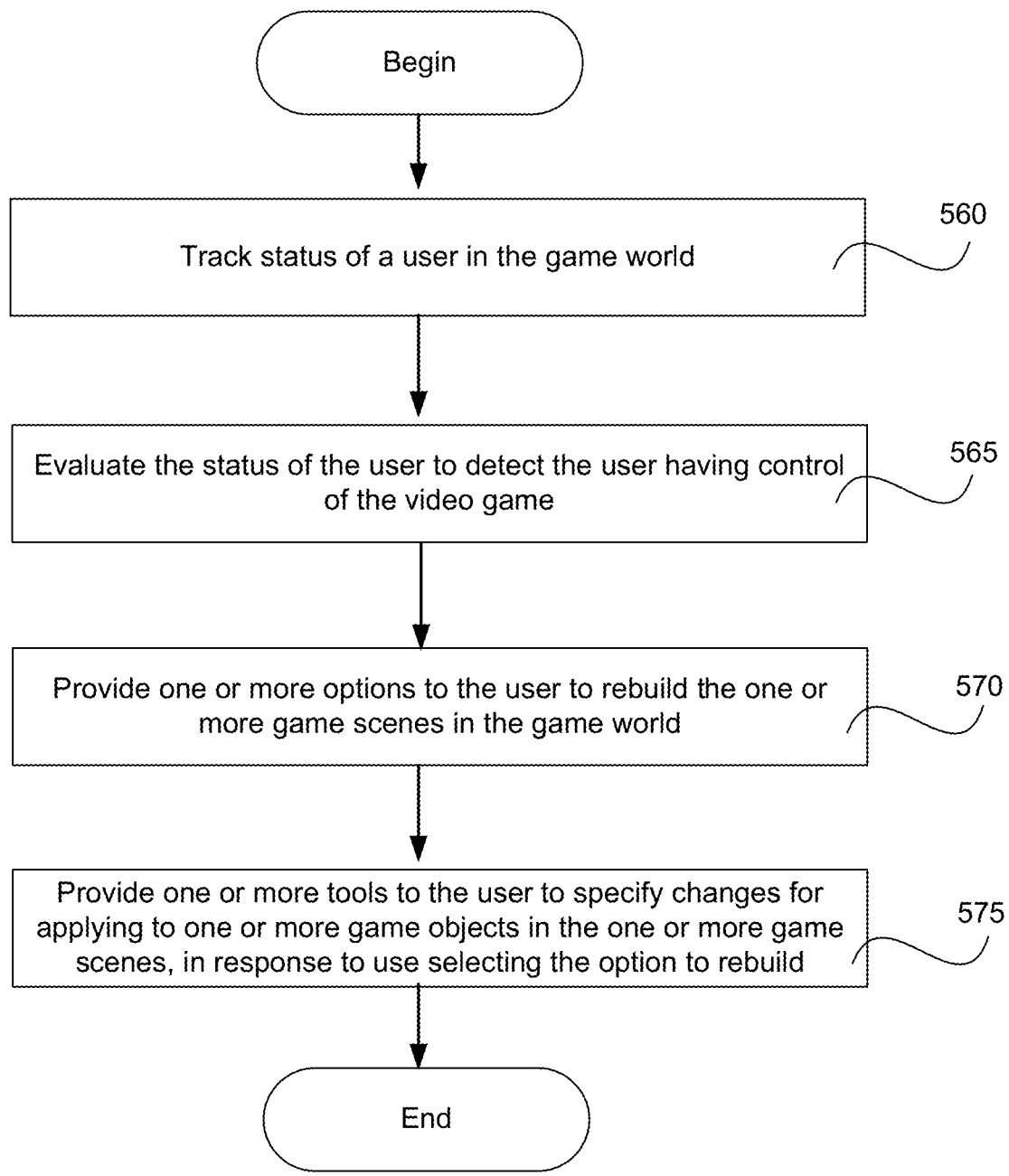
FIG. 5B illustrates a sample flow of operations of a method for rebuilding game world of a video game, in accordance with one implementation.

FIG. 5B illustrates flow of operations of a method for reconstructing a game world of a video game, in accordance with some implementations. The method begins by tracking status of a user within the game world of the video game, as illustrated in operation 560. The user can progress through different challenges in different game scenes and reach different levels of the video game. As the user progresses through the different levels, the status of the user changes to match with the user's progression in the video game. The status of the user is evaluated to determine if the user has control of the video game within a particular game scene, as illustrated in operation 565. In some implementations, the user can be said to be in control of the video game in a particular game scene when the user has completed all the tasks/challenges within the game scene and/or has defeated a monster and/or captured a particular game asset and/or captured an adversary within the game scene. For example, the user could have defeated a strong adversary or a monster and taken control of a game scene, such as a city. In this example, the adversary or the monster could have taken the citizens of the city captive and the user could have come to rescue the citizens of the city and release the citizens from the clutches of the adversary or monster by defeating the adversary or the monster. Defeating the adversary or the monster could have resulted in lot of damage to the city due to the different portions of the city getting exposed to the interactions between the user and the adversary/monster. In some implementations, the evaluation of the user's status is performed periodically. In alternate implementations, the user's status is evaluated upon detecting the user completing the tasks/challenges in the game scene.

Based on the evaluation of the user's status, when it is detected that the user is in control of the video game within the game scene (e.g., taken possession of the city by defeating the monster/adversary from the above example), the user is provided with one or more options to rebuild the game scene of the video game, as illustrated in operation 570. The game scene of the video game (e.g., the city scene from the above example) is identified based on an amount of wear exhibited by one or more game objects within the game scene (e.g., wear exceeding a predefined threshold, such as the city scene with buildings and other infrastructure damaged during the fight between the user and the adversary or monster).

When the user selects an option to rebuild, one or more tools are provided to the user to specify changes to the one or more game objects included in the game scene, as illustrated in operation 575. The tools are identified based on type of game objects and the game scene that are selected for rebuilding. The changes specified by the user are applied to the one or more game objects in the game scene, wherein the application of the changes include updating attributes of the one or more game objects to reflect the changes specified by the user. The rebuilt game objects with the updated attributes reflecting the changes specified by the user are stored in the game play datastore and used during subsequent game play of the video game either in the current gameplay session or subsequent gameplay session. The rebuilt game objects are devoid of all wear or at least a major portion of the wear and the rebuilt game objects exhibits wear, if any, that is substantially less than the predefined threshold. As noted previously, the options and tools for rebuilding game objects and game scenes allow the user to have some control and involvement in shaping and building the game world designed by a game developer, making it interesting for the user thereby potentially increasing game engagement of the user in the video game.

Figure 6:
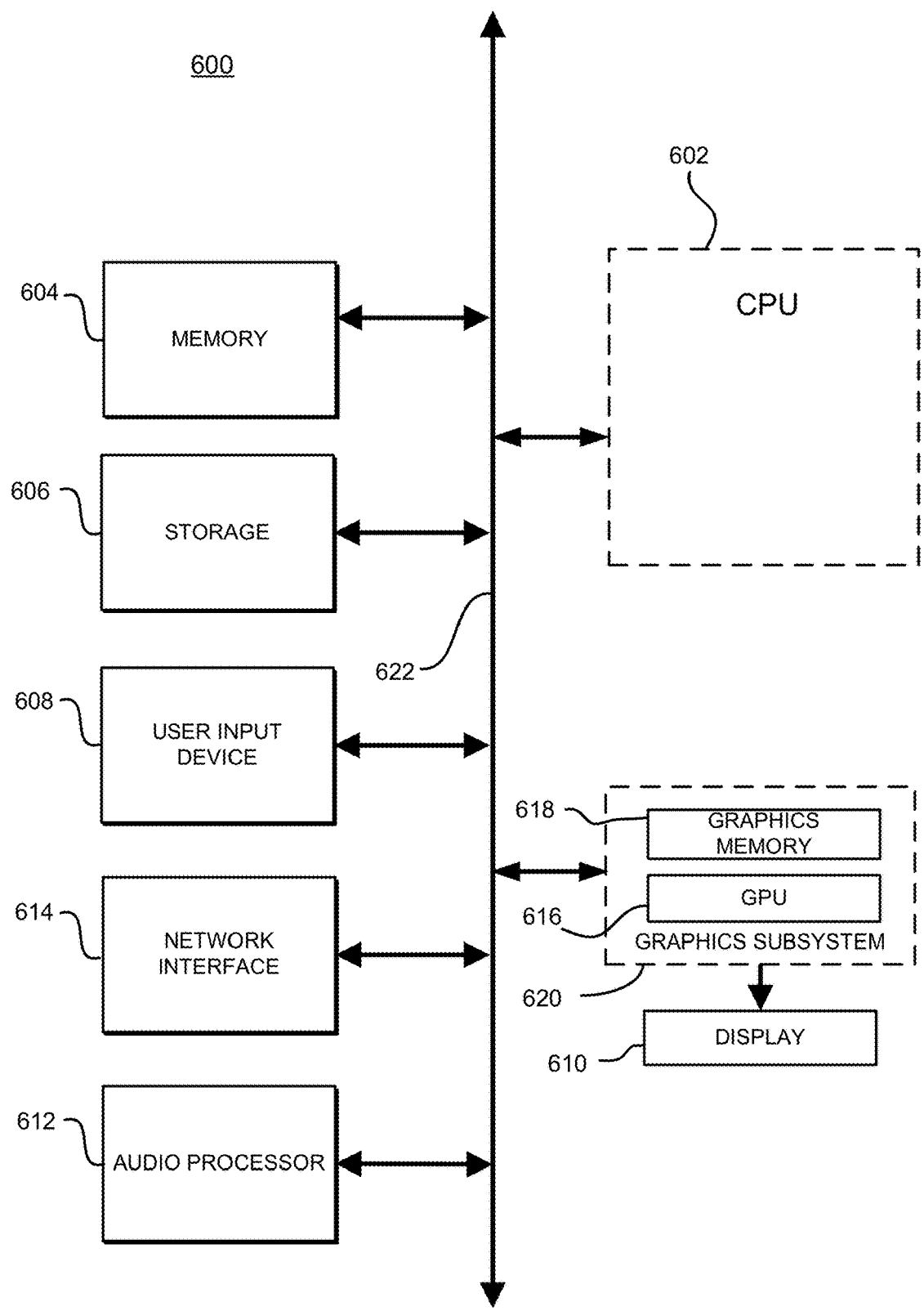
FIG. 6 illustrates components of an example device that can be used to perform aspects of the various implementations of the present disclosure.

FIG. 6 illustrates components of an example device 600 that can be used to perform aspects of the various embodiments of the present disclosure. This block diagram illustrates the device 600 that can incorporate or can be a personal computer, video game console, personal digital assistant, a server or other digital device, suitable for practicing an embodiment of the disclosure. The device 600 includes a CPU 602 for running software applications and optionally an operating system. The CPU 602 includes one or more homogeneous or heterogeneous processing cores. For example, the CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 600 can be a localized to a player playing a game segment (e.g., game console), or remote from the player (e.g., back-end server processor), or one of many servers using virtualization in a game cloud system for remote streaming of gameplay to clients.

A memory 604 stores applications and data for use by the CPU 602. A data storage 606 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 608 communicate user inputs from one or more users to the device 600. Examples of the user input devices 608 include keyboards, mouse, joysticks, touch pads, touch screens, still or video recorders/cameras, tracking devices for recognizing gestures, and/or microphones. A network interface 614 allows the device 600 to communicate with other computer systems via an electronic communications network, and may include wired or wireless communication over local area networks and wide area networks, such as the internet. An audio processor 612 is adapted to generate analog or digital audio output from instructions and/or data provided by the CPU 602, the memory 604, and/or data storage 606. The components of device 600, including the CPU 602, the memory 604, the data storage 606, the user input devices 608, the network interface 614, and an audio processor 612 are connected via a data bus 622.

A graphics subsystem 620 is further connected with the data bus 622 and the components of the device 600. The graphics subsystem 620 includes a graphics processing unit (GPU) 616 and a graphics memory 618. The graphics memory 618 includes a display memory (e.g., a frame buffer) used for storing pixel data for each pixel of an output image. The graphics memory 618 can be integrated in the same device as the GPU 616, connected as a separate device with the GPU 616, and/or implemented within the memory 604. Pixel data can be provided to the graphics memory 618 directly from the CPU 602. Alternatively, the CPU 602 provides the GPU 616 with data and/or instructions defining the desired output images, from which the GPU 616 generates the pixel data of one or more output images. The data and/or instructions defining the desired output images can be stored in the memory 604 and/or the graphics memory 618. In an embodiment, the GPU 616 includes three-dimensional (3D) rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from the graphics memory 618 to be displayed on the display device 610. The display device 610 can be any device capable of displaying visual information in response to a signal from the device 600, including a cathode ray tube (CRT) display, a liquid crystal display (LCD), a plasma display, and an organic light emitting diode (OLED) display. The device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a meta-verse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the meta-verse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other meta-verse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or meta-verse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for reconstructing a game world of a video game, comprising:
    tracking status of one or more game objects included in the game world of the video game during game play, the one or more game objects are used to define game scenes provided for rendering at client devices of a plurality of users;
    detecting wear on the one or more game objects, the wear progressively increasing over time during game play due to exposure to interactions resulting in actions occurring in the game world;
    providing an option to a user of the plurality of users to rebuild the one or more game objects used in the game world that have experienced the wear, and
    providing one or more tools to rebuild the one or more game objects in the game world, in response to the user selecting the option to rebuild, the one or more tools used to allow the user to specify changes for applying to the one or more game objects in the game world, wherein operations of the method are performed by a processor of a computing device.

2. The method of claim 1, wherein the actions occurring in the game world originate from one or more users of the plurality of users, or from the one or more game objects included in the game world.

3. The method of claim 1, wherein tracking status includes identifying the actions occurring in the game world and evaluating effect of each action on each of the one or more game objects in the game world, the effect of each action identifying an amount of wear on said each of the one or more game objects.

4. The method of claim 1, wherein the one or more game objects are virtual game objects, and
    wherein the changes specified using the one or more tools include adjustments to specific ones of attributes defining the wear, the adjustments to attributes which when applied to the virtual game objects cause the virtual game objects to be devoid of wear.

5. The method of claim 1, wherein the one or more game objects are virtual game objects,
    wherein tracking status includes,
        generating a non-fungible token (NFT) for each virtual game object used in the game world, the NFT for said each virtual game object generated to include attributes defining said each virtual game object, the attributes include physical attributes and kinetic attributes, the NFT of said each virtual game object dynamically updated to record any variations in any one or more of the physical and the kinetic attributes detected during game play.

6. The method of claim 5, wherein the virtual game objects include at least a game asset of the user used to provide interactions during the game play of the video game, the NFT generated for the game asset used in transferring the game asset of the user from the video game to a second video game played by the user and associating the game asset in the second video game to the user, the NFT for the game asset updated to include the variations in any one or more of the attributes of the game asset in the second video game, and wherein the one or more tools provided to rebuild the one or more game objects are further configured to automatically update the game asset used in one or more game scenes of the video game and the second video game with the variations to the attributes of the game asset specified by the user during rebuild.

7. The method of claim 1, wherein each game object is a virtual game object used to provide interactions directed toward one or more virtual game characters associated with other users or with other virtual game objects in a game scene, or is the virtual game object used to define the game scene.

8. The method of claim 1, wherein a tool of the one or more tools used to rebuild a game object of the one or more game objects is selected to correspond with a type of said game object that is to be re-built;

wherein applying changes to the one or more game objects in the game world further includes,
generating a re-built game object corresponding to each game object of the one or more game objects by applying the changes specified using the one or more tools; and
updating one or more game scenes in the game world in which the one or more game objects showing the wear are disposed, the updating is done by replacing the one or more game objects showing the wear with the corresponding one or more re-built game objects that are devoid of any wear,
wherein the game logic is designed to automatically recognize the changes included in the one or more game scenes for generating game data.

9. The method of claim 1, wherein providing the one or more tools includes a tool to rebuild a game scene in which the one or more game objects are disposed, wherein rebuilding of the game scene includes relocating the one or more re-built game objects to one or more new locations, or removing the one or more re-built game objects included therein, or replacing one or more game objects showing the wear with corresponding ones of the re-built game objects within the game scene.

10. The method of claim 1, wherein providing the options includes providing at least a first option to rebuild a specific game object of the one or more game objects, a second option to rebuild a select group of game objects of the one or more game objects, and a third option to rebuild an entire game scene within the game world where the one or more game objects are disposed.

11. The method of claim 1, wherein detecting wear of a specific game object of the one or more game objects includes assessing damage inflicted on the specific game object over time, wherein the assessing is done by comparing original attributes defining the specific game object without any wear against current attributes of the specific game object that include attributes defining the damage.

12. The method of claim 11, wherein the damage to the specific game object is caused by interactions originating from the user, or interactions originating from a second user, or interactions with another game object.

13. The method of claim 1, wherein the one or more game objects includes a game asset of the user used for providing interactions during the game play of the video game, and wherein providing the option includes providing the user with a tool to dynamically rebuild the game asset.

14. The method of claim 1, wherein providing the option to rebuild includes providing an incentive to the user for rebuilding the one or more game objects, the incentive customized based on a game play status of the user, wherein the incentive provided to the user is a video game related incentive usable in the game world, or a monetary incentive,
wherein the video game related incentive is an additional game asset or a game token or a game key usable in the game world, and wherein the monetary incentive is one of a real currency or a game currency.

15. The method of claim 1, wherein the option to rebuild the one or more game objects is provided to the user upon reaching a specific level in the video game, wherein the specific level includes anyone or more of reaching a certain level in the video game, overcoming predefined amount of challenges in the video game, earning a predefined amount of game assets, possessing a certain game asset, and capturing a defined number of opponents.

16. A method for reconstructing a game world of a video game, comprising:

tracking a status of a user in the game world during game play of the video game;
evaluating the status of the user to detect the user having control of the video game during the game play;
providing one or more options to the user to rebuild one or more game scenes of the game world, in response to detecting the user having the control of the video game, each game scene of the one or more game scenes defined using virtual game objects; and
providing one or more tools to the user to dynamically rebuild the one or more game scenes of the game world, in response to detecting selection of an option of the one or more options to rebuild by the user, the one more tools allowing the user to specify changes for applying to the one or more game scenes in the game world,
wherein operations of the method are performed by a processor of a computing device.

17. The method of claim 16, wherein each option of the one or more options to rebuild the one or more game scenes is provided upon detecting wear on the one or more game objects within one or more game scenes exceeding a threshold value, wherein the wear on the one or more game objects are due to exposure to interactions resulting from actions occurring in the game world during game play.

18. The method of claim 16, wherein rebuilding the one or more game scenes includes, rebuilding the one or more game objects included in the one or more game scenes to generate corresponding one or more re-built game objects, and
replacing the one or more game objects in the one or more game scenes with the corresponding one or more re-built game objects.

19. The method of claim 18, wherein replacing the one or more game objects includes removing or relocating select ones of the one or more re-built game objects within the one or more game scenes.

20. The method of claim 16, wherein the control of the video game by the user is in response to the user overcoming one or more challenges within one or more game scenes of the video game or defeating one or more opponents at least a predefined number of times or reaching a certain level within the video game.

21. The method of claim 16, wherein providing the one or more options includes providing at least a first option to rebuild a specific game scene, a second option to rebuild a select group of game scenes, and a third option to rebuild all the game scenes within the game world.

* * * * *